(12) United States Patent
Kobayashi et al.

(10) Patent No.: US 9,446,761 B2
(45) Date of Patent: Sep. 20, 2016

(54) CONTROL DEVICE

(71) Applicant: AISIN AW CO., LTD., Anjo-shi, Aichi-ken (JP)

(72) Inventors: Yasuhiko Kobayashi, Anjo (JP); Yoichi Tajima, Anjo (JP); Yomei Hakumura, Anjo (JP); Takashi Yoshida, Nishio (JP); Yuma Mori, Kota (JP)

(73) Assignee: AISIN AW CO., LTD., Anjo (JP)

( * ) Notice: Subject to any disclaimer, the term of this patent is extended or adjusted under 35 U.S.C. 154(b) by 86 days.

(21) Appl. No.: 14/477,269

(22) Filed: Sep. 4, 2014

(65) Prior Publication Data

US 2014/0371029 A1 Dec. 18, 2014

Related U.S. Application Data

(62) Division of application No. 13/517,421, filed as application No. PCT/JP2011/058089 on Mar. 30, 2011, now Pat. No. 9,067,592.

(30) Foreign Application Priority Data

| Mar. 31, 2010 | (JP) | 2010-083054 |
| Sep. 29, 2010 | (JP) | 2010-219930 |
| Sep. 29, 2010 | (JP) | 2010-219936 |

(51) Int. Cl.
*B60W 10/02* (2006.01)
*B60W 10/06* (2006.01)
(Continued)

(52) U.S. Cl.
CPC ............. *B60W 20/108* (2013.01); *B60K 6/48* (2013.01); *B60K 23/02* (2013.01); *B60L 11/14* (2013.01); *B60L 15/2054* (2013.01);
(Continued)

(58) Field of Classification Search
CPC ..... B60W 10/02; B60W 10/06; B60W 10/08
USPC ........................................ 701/22; 477/5, 107
See application file for complete search history.

(56) References Cited

U.S. PATENT DOCUMENTS

| 6,581,705 B2 | 6/2003 | Phillips et al. |
| 7,028,795 B2 | 4/2006 | Tabata |

(Continued)

FOREIGN PATENT DOCUMENTS

| CN | 1927612 A | 3/2007 |
| JP | A-9-74608 | 3/1997 |

(Continued)

OTHER PUBLICATIONS

Jan. 26, 2015 Office Action issued in U.S. Appl. No. 13/517,421.

(Continued)

*Primary Examiner* — John Q Nguyen
*Assistant Examiner* — Anshul Sood
(74) *Attorney, Agent, or Firm* — Oliff PLC

(57) ABSTRACT

A control device that controls a vehicle drive device in which a first engagement device, a rotating electrical machine, a second engagement device, and an output member are sequentially arranged in this order from an input member side on a power transmission path that connects the input member drivingly coupled to an internal combustion engine to the output member drivingly coupled to wheels. The control device controls both the first engagement device and the second engagement device to a slip engaged state, and causes the rotating electrical machine to generate electric power.

4 Claims, 9 Drawing Sheets

(51) Int. Cl.

| | | |
|---|---|---|
| *B60W 20/00* | (2016.01) | |
| *B60K 6/48* | (2007.10) | |
| *B60L 11/14* | (2006.01) | |
| *B60W 10/08* | (2006.01) | |
| *B60W 30/18* | (2012.01) | |
| *B60W 30/186* | (2012.01) | |
| *B60K 23/02* | (2006.01) | |
| *B60L 15/20* | (2006.01) | |
| *B60K 17/02* | (2006.01) | |

(52) U.S. Cl.
CPC ............ *B60W 10/02* (2013.01); *B60W 10/06* (2013.01); *B60W 10/08* (2013.01); *B60W 20/15* (2016.01); *B60W 30/186* (2013.01); *B60W 30/18063* (2013.01); *B60K 17/02* (2013.01); *B60L 2240/36* (2013.01); *B60L 2240/485* (2013.01); *B60L 2240/486* (2013.01); *B60L 2240/50* (2013.01); *B60L 2240/507* (2013.01); *B60L 2260/32* (2013.01); *B60W 20/00* (2013.01); *B60W 2510/0291* (2013.01); *B60W 2710/025* (2013.01); *B60W 2710/083* (2013.01); *Y02T 10/6221* (2013.01); *Y02T 10/6286* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/902* (2013.01); *Y10T 477/26* (2015.01)

(56) References Cited

U.S. PATENT DOCUMENTS

| | | | |
|---|---|---|---|
| 7,273,120 | B2 | 9/2007 | Tabata |
| 7,360,616 | B2 | 4/2008 | Schiele |
| 7,395,888 | B2 | 7/2008 | Yamamoto et al. |
| 7,686,112 | B2 | 3/2010 | Shiiba |
| 7,708,095 | B2 | 5/2010 | Hirata |
| 8,491,441 | B2 * | 7/2013 | Fukitani ............... B60K 6/48 477/5 |
| 8,498,765 | B2 | 7/2013 | Tajima et al. |
| 8,512,201 | B2 * | 8/2013 | Shimanaka ............ B60K 6/48 477/5 |
| 9,067,592 | B2 * | 6/2015 | Kobayashi ........... B60W 10/06 |
| 2002/0157883 | A1 | 10/2002 | Ogata et al. |
| 2006/0089235 | A1 * | 4/2006 | Kobayashi ............. B60K 6/48 477/107 |
| 2006/0243501 | A1 | 11/2006 | Hidaka |
| 2006/0247086 | A1 | 11/2006 | Watanabe et al. |
| 2007/0056784 | A1 | 3/2007 | Joe et al. |
| 2007/0272456 | A1 | 11/2007 | Shiiba |
| 2007/0278022 | A1 | 12/2007 | Tanishima |
| 2009/0105918 | A1 | 4/2009 | Kobayashi et al. |
| 2009/0143950 | A1 | 6/2009 | Hasegawa et al. |
| 2009/0234524 | A1 | 9/2009 | Kim |
| 2011/0021312 | A1 | 1/2011 | Fukitani |
| 2011/0039655 | A1 | 2/2011 | Kaltenbach et al. |

FOREIGN PATENT DOCUMENTS

| | | |
|---|---|---|
| JP | A-9-238403 | 9/1997 |
| JP | A-11-150805 | 6/1999 |
| JP | A-2000-213386 | 8/2000 |
| JP | A-2002-159105 | 5/2002 |
| JP | 2004-242450 A | 8/2004 |
| JP | A-2006-306325 | 11/2006 |
| JP | A-2006-306328 | 11/2006 |
| JP | A-2007-314097 | 12/2007 |
| JP | A-2008-7094 | 1/2008 |
| JP | A-2008-62688 | 3/2008 |
| JP | A-2008-222222 | 9/2008 |
| JP | A-2009-255876 | 11/2009 |
| JP | A-2010-143306 | 7/2010 |
| JP | A-2010-155590 | 7/2010 |
| JP | A-2010-202151 | 9/2010 |
| JP | A-2011-20542 | 2/2011 |
| JP | A-2011-25811 | 2/2011 |
| JP | A-2011-31659 | 2/2011 |
| JP | A-2011-507746 | 3/2011 |
| WO | 01/83967 A1 | 11/2001 |
| WO | WO 2009/074480 A1 | 6/2009 |
| WO | WO 2012/043555 A1 | 4/2012 |

OTHER PUBLICATIONS

Office Action issued in Japanese Patent Application No. 2011-198359 dated Nov. 21, 2013 (with partial translation).

International Search Report issued in International Patent Application No. PCT/JP2011/058089 dated Jun. 28, 2011 (with translation).

International Search Report issued in International Patent Application No. PCT/JP2011/072067 dated Nov. 22, 2011 (with translation).

Office Action issued in U.S. Appl. No. 13/240,065 dated Jan. 17, 2013.

International Search Report issued in International Patent Application No. PCT/JP2011/058091 dated Jul. 5, 2011 (with translation).

Sep. 5, 2014 Office Action issued in U.S. Appl. No. 13/517,275.

* cited by examiner

FIG. 2

| DRIVE MODE | | STARTING CLUTCH CS | FIRST CLUTCH C1 | ROTATING ELECTRICAL MACHINE |
|---|---|---|---|---|
| ELECTRIC DRIVE MODE | | × | ○ | POWER RUNNING |
| PARALLEL DRIVE MODE | PARALLEL ASSIST MODE | ○ | ○ | POWER RUNNING |
| | PARALLEL POWER GENERATION MODE | ○ | ○ | POWER GENERATION |
| SLIP DRIVE MODE | SLIP ASSIST MODE | △ | △ | POWER RUNNING |
| | FIRST SLIP POWER GENERATION MODE | △ | △ | POWER GENERATION |
| | SECOND SLIP POWER GENERATION MODE | △ | ○ | POWER GENERATION |
| STOPPED-STATE POWER GENERATION MODE | | ○ | × | POWER GENERATION |

CONTROL DEVICE

INCORPORATION BY REFERENCE

This Application is a Divisional Application of U.S. patent application Ser. No. 13/517,421, filed on Jun. 20, 2012, which in turn claims priority of PCT/JP2011/058089 filed on Mar. 30, 2011, Japanese Patent Application No. 2010-083054 filed on Mar. 31, 2010, Japanese Patent Application No. 2010-219936 filed on Sep. 29, 2010, and Japanese Patent Application No. 2010-219930 filed on Sep. 29, 2010. The disclosure of the priority documents including the specification, drawings and abstract is incorporated herein by reference in its entirety.

BACKGROUND OF THE INVENTION

The present invention relates to control devices that control a vehicle drive device in which a first engagement device, a rotating electrical machine, a second engagement device, and an output member are sequentially arranged in this order from an input member side on a power transmission path that connects the input member drivingly coupled to an internal combustion engine to the output member drivingly coupled to wheels.

DESCRIPTION OF THE RELATED ART

A control device described in, e.g., the following Japanese Patent Application Publication No. 2008-7094 (JP 2008-7094 A) is known as such control devices that control a vehicle drive device. In the following description in this section "Description of the Related Art," reference characters (including the names of corresponding members, as required) in JP 2008-7094 A are shown in parenthesis "[ ]." The control device [controllers 1, 2, 5, 7, 10, etc.] of JP 2008-7094 A is configured to be able to implement a plurality of drive modes by controlling the vehicle drive device. The plurality of drive modes include a WSC creep mode, a CL2 overheat mode, and a WSC active power generation mode.

In the WSC creep mode, the first engagement device [first clutch CL1] is brought into a direct-coupling engaged state, the second engagement device [second clutch CL2] is controlled to a slip engaged state, and a vehicle creeps at a low vehicle speed with by the torque of the internal combustion engine [engine E]. In the CL2 overheat mode, both the first engagement device and the second engagement device are controlled to the slip engaged state, and the vehicle creeps by the torque of the internal combustion engine. In the WSC active power generation mode, the first engagement device is brought into the direct-coupling engaged state, the second engagement device is controlled to the slip engaged state, and the vehicle travels (including creeping) by the torque of the internal combustion engine and the rotating electrical machine [motor-generator MG] generates electric power. Mode transition can be made between the WSC creep mode and the CL2 overheat mode and between the WSC creep mode and the WSC active power generation mode.

In the device of JP 2008-7094 A, if the amount of electric power stored in an electrical storage device [battery 4] decreases during low-speed traveling in the WSC creep mode, the WSC creep mode is preferentially transitioned to the WSC active power generation mode rather than to the CL2 overheat mode in order to allow the rotating electrical machine to generate electric power to restore the amount of stored electric power. However, in the WSC active power generation mode, the internal combustion engine rotates with the rotating electrical machine with the first engagement device being in the direct-coupling engaged state, and the differential rotational speed between engagement members on both sides of the second engagement device in the slip engaged state becomes relatively large. This increases the amount of heat generation of the second engagement device, which may affect durability of the second engagement device.

SUMMARY OF THE INVENTION

It is therefore desired to implement a control device capable of suppressing the amount of heat generation of a second engagement device, in a specific traveling state such as when a vehicle travels at a low vehicle speed.

A control device according to a first aspect of the present invention controls a vehicle drive device in which a first engagement device, a rotating electrical machine, a second engagement device, and an output member are sequentially arranged in this order from an input member side on a power transmission path that connects the input member drivingly coupled to an internal combustion engine to the output member drivingly coupled to wheels. The control device controls both the first engagement device and the second engagement device to a slip engaged state, and causing the rotating electrical machine to generate electric power.

As used herein, the expression "drivingly coupled" refers to the state in which two rotating elements are coupled together so that a driving force can be transmitted between the two rotating elements, and is used as a concept including the state in which the two rotating elements are coupled together so as to rotate together, or the state in which the two rotating elements are coupled together so that the driving force can be transmitted between the two rotating elements via one or more transmission members. Such transmission members include various members that transmit rotation at the same speed or at a shifted speed, and include, e.g., a shaft, a gear mechanism, a belt, a chain, etc. Such transmission members may include an engagement device that selectively transmits rotation and a driving force, such as, e.g., a friction clutch. The term "driving force" is herein used as a synonym for "torque."

The term "rotating electrical machine" is herein used as a concept including all of a motor (an electric motor), a generator (an electric generator), and a motor-generator that functions both as the motor and the generator as necessary.

The term "slip engaged state" herein refers to the state in which engagement members on both sides of an intended engagement device are engaged together with a rotational speed difference between the engagement members, so that a driving force can be transmitted between the engagement members. Note that the term "direct-coupling engaged state" herein refers to the state in which the engagement devices on both sides are engaged together so as to rotate together.

According to the first aspect, both the first engagement device and the second engagement device are controlled to the slip engaged state. Thus, a differential rotational speed between engagement members on both sides of the second engagement device can be reduced as compared to, e.g., the case where the first engagement device is brought into the direct-coupling engaged state and the second engagement device is brought into the slip engaged state in a situation (hereinafter referred to as the "low output rotation situation") in which it is desired to rotate the output member at a rotational speed lower than the rotational speed of the output member that is obtained on the assumption that both the first engagement device and the second engagement device are brought into the direct-coupling engaged state while driving the internal combustion engine at such a rotational speed that allows the internal combustion engine to continue its self-sustained operation. Accordingly, the amount of heat generation of the second engagement device can be suppressed.

In the first aspect, the rotational speed of the rotating electrical machine can be maintained at a value higher than the rotational speed of the output member by bringing the second engagement device into the slip engaged state. Accordingly, even in the low output rotation situation, the rotating electrical machine rotating at a higher rotational speed than the output member can be made to generate electric power, and a desired amount of electric power can be secured.

Thus, according to the first aspect, the control device can be implemented which is capable of securing the desired amount of electric power while suppressing the amount of heat generation of the second engagement device.

In a state in which torque transferred to the input member is transferred to the output member, the control device may control the rotating electrical machine so that an amount of power generation by the rotating electrical machine becomes equal to a predetermined required power generation amount, and may control the second engagement device so that the torque that is transferred to the output member becomes equal to a required driving force that is required to drive a vehicle.

By controlling the rotating electrical machine and the second engagement device as in this configuration, the required power generation amount can be appropriately secured, and the vehicle can be appropriately driven by transferring the torque corresponding to the required driving force of the vehicle to the output member.

The control device may control the first engagement device so that a transfer torque capacity of the first engagement device becomes equal to a sum of power generation torque that is applied to the rotating electrical machine in order to cause the rotating electrical machine to generate the electric power and the required driving force.

According to this configuration, the torque that is equal to the total amount of the power generation torque and the required driving force can be transferred via the first engagement device to a downstream side of the first engagement device in the power transmission path connecting the input member to the output member. The required power generation amount can be appropriately secured by controlling the rotating electrical machine so that the amount of power generation becomes equal to the required power generation amount by using a part of this torque. Moreover, the vehicle can be appropriately driven by transferring the remaining torque, namely the torque corresponding to the required driving force, to the output member.

The control device may control the rotating electrical machine so that a rotational speed of the rotating electrical machine becomes equal to a predetermined target rotational speed, and may control the second engagement device so that a transfer torque capacity of the second engagement device becomes equal to the required driving force.

According to this configuration, the vehicle can be appropriately driven by transferring the torque corresponding to the required driving force to the output member via the second engagement device. In this configuration, rotational speed control is performed on the rotating electrical machine, whereby the rotational speed of the rotating electrical machine can be more easily controlled to a value that is lower than the rotational speed of the input member driven by the internal combustion engine and higher than the rotational speed of the output member proportional to the rotational speed of the wheels. Thus, the torque that is transferred to the input member can be transferred to the rotating electrical machine and the output shaft by using a property in which the engagement device in the slip engaged state transmits the driving force from the engagement member having a higher rotational speed to the engagement member having a lower rotational speed.

The target rotational speed may be set to a value lower than the rotational speed of the input member and higher than the rotational speed of the output member, and may be set based on at least the required power generation amount.

According to this configuration, the torque that is transferred to the input member can be appropriately transferred to the rotating electrical machine and the output member. Moreover, the desired amount of electric power can be appropriately secured by setting the target rotational speed in the rotational speed control of the rotating electrical machine based on the required power generation amount.

In a first specific traveling state in which an estimated rotational speed of the rotating electrical machine, which is determined based on a rotational speed of the output member on an assumption that the input member is driven by the internal combustion engine and the second engagement device is in the direct-coupling engaged state having no differential rotation, is lower than a required rotational speed of the rotating electrical machine that is required to secure the predetermined required power generation amount, the control device may control both the first engagement device and the second engagement device to the slip engaged state, and cause the rotating electrical machine to generate the electric power by the torque that is transferred to the input member, and in a second specific traveling state in which the estimated rotational speed is equal to or higher than the required rotational speed, the control device may control the first engagement device to the slip engaged state and the second engagement device to the direct-coupling engaged state, and may cause the rotating electrical machine to generate the electric power by the torque that is transferred to the input member.

According to this configuration, in the first specific traveling state in which the estimated rotational speed of the rotating electrical machine, which is estimated on the assumption that the second engagement device is in the direct-coupling engaged state, is lower than the predetermined required rotational speed, both the first engagement and the second engagement devices are brought into the slip engaged state. Thus, the rotational speed of the rotating electrical machine can be maintained at a value higher than the rotational speed of the output member, and also can be maintained at the predetermined required rotational speed or higher. Accordingly, even in the first specific traveling state, the desired amount of electric power can be secured by causing the rotating electrical machine to generate electric power by the torque of the internal combustion engine that is transferred to the input member.

On the other hand, in the second specific traveling state in which the estimated rotational speed of the rotating electrical machine, which is estimated on the assumption that the second engagement device is in the direct-coupling engaged state, is equal to or higher than the predetermined required rotational speed, the second engagement devices is brought into the direct-coupling engaged state. Thus, the differential rotational speed between the engagement members on both sides of the second engagement device can be made to be zero so that no heat generation occurs, while securing the desired amount of electric power.

A target differential rotational speed as a target value of the differential rotational speed between the engagement members on both sides of the second engagement device may be determined based on an allowable upper limit temperature of the second engagement device that is provided to allow the second engagement device to operate continuously, and the target rotational speed may be determined based on at least the target differential rotational speed.

According to this configuration, the target differential rotational speed is determined so that the temperature of the second engagement device does not exceed the allowable upper limit temperature, and the target rotational speed of the rotating electrical machine according to the rotational speed of the output member is determined based on the target differential rotational speed. Thus, heat generation due to slipping between the engagement members on both sides of the second engagement device can be suppressed to a predetermined amount or less. Accordingly, durability of the second engagement device can be more easily ensured while suppressing an increase in cost of the second engagement device.

The target rotational speed may be determined based on at least one of an allowable upper limit temperature of the rotating electrical machine that is provided to allow the rotating electrical machine to operate continuously and an allowable upper limit temperature of a controller of the rotating electrical machine that is provided to allow the controller to operate continuously.

According to this configuration, the target rotational speed of the rotating electrical machine is determined so that the temperature of the rotating electrical machine does not exceed the allowable upper limit temperature. Thus, heat generation associated with operation of the rotating electrical machine can be suppressed to a predetermined amount or less. Accordingly, durability of the rotating electrical machine can be more easily ensured without unnecessarily increasing cooling performance and heat resistance of the rotating electrical machine. Moreover, the target rotational speed of the rotating electrical machine is determined so that the temperature of the controller of the rotating electrical machine does not exceed the allowable upper limit temperature. Thus, heat generation associated with operation of the controller can be suppressed to a predetermined amount or less. Accordingly, durability of the controller can be more easily ensured without unnecessarily increasing cooling performance and heat resistance of the controller. Thus, the durability of one or both of the rotating electrical machine and the controller thereof can be ensured while suppressing an increase in cost.

The required power generation amount may be set in advance based on rated power consumption of an auxiliary machine provided in the vehicle.

According to this configuration, the electric power can be generated by an amount corresponding to predicted electric power that is predicted to be consumed by the auxiliary machine in the vehicle during traveling of the vehicle. Moreover, in this configuration, since the power generation by the rotating electrical machine can be suppressed to a relatively small amount, the rotational speed of the rotating electrical machine can be reduced. That is, the differential rotational speed between the engagement members on both sides of the second engagement device can be reduced, and heat generation of the second engagement device can be suppressed. Accordingly, satisfactory performance of the second engagement device can be maintained while providing the amount of electric power that is consumed by the auxiliary machine by power generation of the rotating electrical machine.

Actual power consumption of the auxiliary machine provided in the vehicle during traveling of the vehicle may be calculated, and the required power generation amount may be set based on the actual power consumption.

According to this configuration, the amount of electric power corresponding to the electric power that is actually consumed by the auxiliary machine in the vehicle during traveling of the vehicle can be generated. Moreover, in this configuration, since the amount of power generation by the rotating electrical machine can be reduced to the minimum required amount, the rotational speed of the rotating electrical machine can be reduced. That is, the differential rotational speed between the engagement members on both sides of the second engagement device can be reduced, and heat generation of the second engagement device can be suppressed. Accordingly, satisfactory performance of the second engagement device can be maintained while reliably providing the amount of electric power that is actually consumed by the auxiliary machine by power generation of the rotating electrical machine.

The control device may control the vehicle drive device which includes, between the rotating electrical machine and the output shaft, a speed change mechanism having one or more engagement devices and capable of switching between a plurality of shift modes by selectively drivingly coupling the one or more engagement devices, and in which one of the one or more engagement devices is the second engagement device.

Engagement devices provided in a speed change mechanism and capable of being selectively driven to switch a shift mode are typically designed on the assumption that the engagement devices are maintained in the slip engaged state only for a very short time during which the engagement devices switch the shift mode. Accordingly, for such engagement devices themselves, measures are rarely taken against heat generation. If the engagement members are maintained in the slip engaged state for a relatively long time, the amount of heat generation can increase, thereby creating disadvantageous conditions. Moreover, the rotational speed of an engagement member on the output-member side of the second engagement device as one of such engagement devices is very low in, e.g., the low output rotation situation described above, the differential rotational speed between the engagement members on both sides of the second engagement device increases to a relatively large value, and the amount of heat generation of the second engagement device tends to increase.

In this regard, in the above configuration, even if the second engagement device is configured by using one of the engagement devices provided in the speed change mechanism, the amount of heat generation by the engagement device functioning as the second engagement device can be suppressed, and the desired amount of electric power can be secured while maintaining satisfactory performance of the engagement device.

BRIEF DESCRIPTION OF THE DRAWINGS

FIG. 2 is a table showing drive modes that can be implemented by the control device;

DETAILED DESCRIPTION OF THE EMBODIMENTS

1. First Embodiment

A first embodiment of a control device according to the present invention will be described below with reference to the accompanying drawings. A control device 3 according to the present embodiment is a drive device control device that controls a drive device 1. The drive device 1 according to the present embodiment is a vehicle drive device (a hybrid vehicle drive device) that drives a vehicle (a hybrid vehicle) 6 including both an internal combustion engine 11 and a rotating electrical machine 12 as driving force sources. The control device 3 according to the present embodiment will be described in detail below.

In the following description, regarding the state of each engagement device, the "disengaged state" refers to the state in which rotation and a driving force are not transmitted between engagement members on both sides of the engagement device. The "slip engaged state" refers to the state in which the engagement members on both sides are engaged together with a rotational speed difference therebetween, so that the driving force can be transmitted therebetween. The "direct-coupling engaged state" refers to the state in which the engagement members on both sides are engaged together so as to rotate together.

The "engagement pressure" refers to the pressure that presses one engagement member and the other engagement member against each other. The "disengagement pressure" refers to the pressure that allows the engagement device to be steadily in the disengaged state. The "disengagement boundary pressure" refers to the pressure (the disengagement-side slip boundary pressure) that brings the engagement device into a slip boundary state as a boundary between the disengaged state and the slip engaged state. The "engagement boundary pressure" refers to the pressure (the engagement-side slip boundary pressure) that brings the engagement device into a slip boundary state as a boundary between the slip engaged state and the direct-coupling engaged state. The "full engagement pressure" refers to the pressure that allows the engagement device to be steadily in the direct-coupling engaged state.

1-1. Configuration of Drive Device

Figure 1:
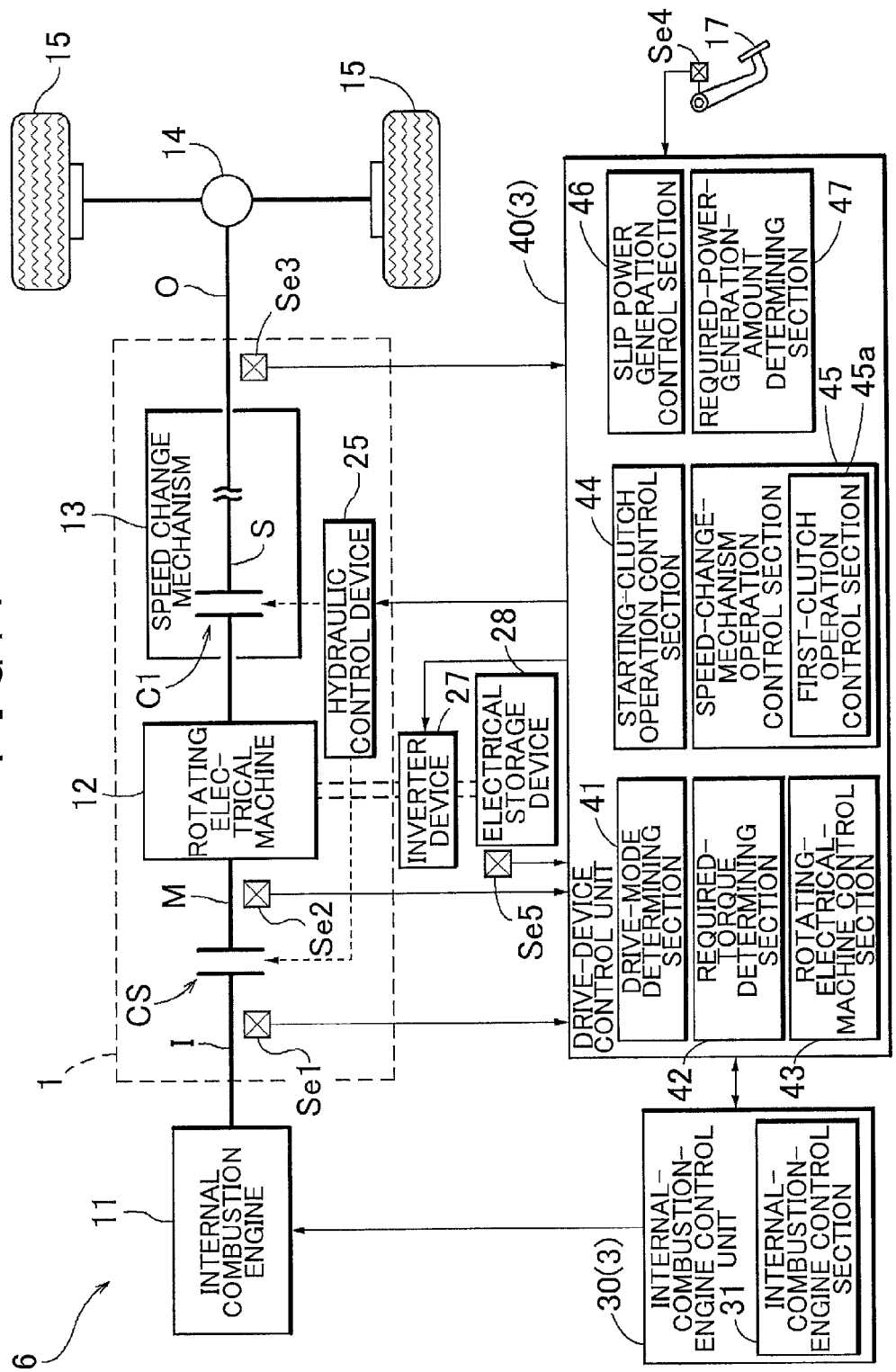
FIG. 1 is a schematic diagram showing a schematic configuration of a vehicle drive device and a control device thereof according to a first embodiment.

First, the configuration of the drive device 1 to be controlled by the control device 3 according to the present embodiment will be described. The drive device 1 according to the present embodiment is configured as a drive device for so-called one-motor parallel type hybrid vehicles. As shown in FIG. 1, this drive device 1 includes a starting clutch CS, the rotating electrical machine 12, a speed change mechanism 13, and an output shaft O in this order from an input shaft I side on a power transmission path that connects the input shaft I drivingly coupled to the internal combustion engine 11 to the output shaft O drivingly coupled to wheels 15. These elements are arranged on the same axis. Note that the speed change mechanism 13 includes a first clutch C1 for shifting, as described below. Thus, the starting clutch CS, the rotating electrical machine 12, the first clutch C1, and the output shaft O are sequentially arranged in this order from the input shaft I side on the power transmission path that connects the input shaft I to the output shaft O. Each of these configurations is accommodated in a drive device case (not shown). In the present embodiment, the input shaft I functions as an "input member" in the present invention, and the output shaft O functions as an "output member" in the present invention.

The internal combustion engine 11 is a motor that is driven by combustion of fuel inside the engine and outputs motive power. For example, a gasoline engine, a diesel engine, etc. can be used as the internal combustion engine 11. The internal combustion engine 11 is drivingly coupled to the input shaft I so as to rotate therewith. In this example, an output shaft such as a crankshaft of the internal combustion engine 11 is drivingly coupled to the input shaft I. Note that it is also preferable that the internal combustion engine 11 be drivingly coupled to the input shaft I via other device such as a damper. The internal combustion engine 11 is drivingly coupled to the rotating electrical machine 12 via the starting clutch CS.

The starting clutch CS is provided between the internal combustion engine 11 and the rotating electrical machine 12. The starting clutch CS is a friction engagement device that selectively drivingly couples the input shaft I to an intermediate shaft M and the output shaft O, and functions as a friction engagement device for separating the internal combustion engine. In the present embodiment, the starting clutch CS is configured as a wet multi-plate clutch. In the present embodiment, the starting clutch CS is placed in an oil-tight state in a clutch housing that surrounds the starting clutch CS, and is basically always soaked in oil in the clutch housing. The present embodiment uses a configuration in which the entire starting clutch CS is always soaked in the oil, whereby satisfactory cooling performance of the starting clutch CS can be maintained. In the present embodiment, the starting clutch CS functions as a "first engagement device" in the present invention.

The rotating electrical machine 12 has a rotor and a stator (not shown), and is capable of performing a function as a motor (an electric motor) that is supplied with electric power to generate motive power and a function as a generator (an electric generator) that is supplied with motive power to generate electric power. The rotor of the rotating electrical machine 12 is drivingly coupled to the intermediate shaft M so as to rotate therewith. The rotating electrical machine 12 is electrically connected to an electrical storage device 28 via an inverter device 27. A battery, a capacitor, etc. can be used as the electrical storage device 28. The rotating electrical machine 12 is supplied with electric power from the electrical storage device 28 to perform power running, or supplies output torque of the internal combustion engine 11 and electric power generated by the inertia force of the vehicle 6 to the electrical storage device 28 to store the electric power therein. The intermediate shaft M that rotates with the rotor of the rotating electrical machine 12 is drivingly coupled to the speed change mechanism 13. That is, the intermediate shaft M serves as an input shaft (a shift input shaft) of the speed change mechanism 13.

The speed change mechanism 13 is a mechanism capable of switching between a plurality of shift modes. In the present embodiment, the speed change mechanism 13 is an automatic stepped speed change mechanism that switchably has a plurality of shift speeds (a kind of shift mode) having different speed ratios. In order to form the plurality of shift speeds, the speed change mechanism 13 has one, two or more gear mechanisms such as a planetary gear mechanism, and a plurality of friction engagement devices such as a clutch and a brake which selectively drivingly couple rotating elements of the gear mechanisms to switch between the plurality of shift speeds. In this example, the speed change mechanism 13 includes the first clutch C1 as one of the plurality of friction engagement devices for shifting. In the present embodiment, the first clutch C1 is configured as a wet multi-plate clutch. The first clutch C1 selectively drivingly couples the intermediate shaft M to a shift intermediate shaft S provided in the speed change mechanism 13. In the present embodiment, the first clutch C1 functions as a "second engagement device" in the present invention. The shift intermediate shaft S is drivingly coupled to the output shaft O via other friction engagement device or a shaft member in the speed change mechanism 13.

The speed change mechanism 13 shifts the rotational speed of the intermediate shaft M and converts the torque thereof at a predetermined speed ratio that is set for each shift speed formed according to the engagement state of the plurality of friction engagement devices, and transfers the resultant torque to the output shaft O. The torque transferred from the speed change mechanism 13 to the output shaft O is distributed and transferred to the two wheels 15 on the right and left sides via an output differential gear unit 14. Thus, the drive device 1 can transfer the torque of one or both of the internal combustion engine 11 and the rotating electrical machine 12 to the wheels 15 to allow the vehicle 6 to travel.

In the present embodiment, the drive device 1 includes an oil pump (not shown) that is drivingly coupled to the intermediate shaft M. The oil pump functions as an oil pressure source that sucks oil stored in an oil pan (not shown) to supply the oil to each part of the drive device 1. The oil pump operates in response to the driving force of one or both of the rotating electrical machine 12 and the internal combustion engine 11, which is transferred via the intermediate shaft M, and discharges the oil to generate an oil pressure. The oil from the oil pump is supplied to the starting clutch CS, the first clutch C1 in the speed change mechanism 13, etc. after being adjusted to a predetermined oil pressure by a hydraulic control device 25. Note that the drive device 1 may include an electric oil pump in addition to the oil pump.

As shown in FIG. 1, a plurality of sensors are provided for each part of the vehicle 6 having this drive device 1 mounted thereon. Specifically, an input-shaft rotational speed sensor Se1, an intermediate-shaft rotational speed sensor Se2, an output-shaft rotational speed sensor Se3, an accelerator-operation-amount detection sensor Se4, and a state-of-charge detection sensor Se5.

The input-shaft rotational speed sensor Se1 is a sensor that detects the rotational speed of the input shaft I. The rotational speed of the input shaft I which is detected by the input-shaft rotational speed sensor Se1 is equal to the rotational speed of the internal combustion engine 11. The intermediate-shaft rotational speed sensor Se2 is a sensor that detects the rotational speed of the intermediate shaft M. The rotational speed of the intermediate shaft M which is detected by the intermediate-shaft rotational speed sensor Se2 is equal to the rotational speed of the rotating electrical machine 12. The output-shaft rotational speed sensor Se3 is a sensor that detects the rotational speed of the output shaft O. The control device 3 can also derive the vehicle speed, which is a traveling speed of the vehicle 6, based on the rotational speed of the output shaft O detected by the output-shaft rotational speed sensor Se3. The accelerator-operation-amount detection sensor Se4 is a sensor that detects an accelerator operation amount by detecting the amount by which an accelerator pedal 17 is operated. The state-of-charge detection sensor Se5 is a sensor that detects an SOC (state of charge). The control device 3 can also derive the amount of electric power stored in the electrical storage device 28, based on the SOC detected by the state-of-charge detection sensor Se5. Information representing the detection result of each sensor Se1 to Se5 is output to the control device 3 described below.

1-2. Configuration of Control Device

Next, the configuration of the control device 3 according to the present embodiment will be described. As shown in FIG. 1, the control device 3 according to the present embodiment includes an internal-combustion-engine control unit 30 that mainly controls the internal combustion engine 11, and a drive-device control unit 40 that mainly controls the rotating electrical machine 12, the starting clutch CS, and the speed change mechanism 13. The internal-combustion-engine control unit 30 and the drive-device control unit 40 function as a core member that performs operation control of each part of the drive device 1.

Each of the internal-combustion-engine control unit 30 and the drive-device control unit 40 includes an arithmetic processing unit, such as CPU, as a core member (not shown). Each function part of the internal-combustion-engine control unit 30 and the drive-device control unit 40 is configured by either software (a program) stored in a ROM etc. or hardware such as an arithmetic circuit etc. provided separately or by both of them. These function parts are configured to be able to receive and transmit information from and to each other. Moreover, the internal-combustion-engine control unit 30 and the drive-device control unit 40 are also configured to be able to receive and transmit information from and to each other. The internal-combustion-engine control unit 30 and the drive-device control unit 40 are configured to be able to obtain the information on the detection result of each sensor Se1 to Se5 described above.

The internal-combustion-engine control unit 30 includes an internal-combustion-engine control section 31.

The internal-combustion-engine control section 31 is a function part that performs operation control of the internal combustion engine 11. The internal-combustion-engine control section 31 performs the operation control of the internal combustion engine 11 by determining target torque and a target rotational speed as a control target of the output torque (internal combustion engine torque Te) and the rotational speed of the internal combustion engine 11, and operating the internal combustion engine 11 according to this control target. In the present embodiment, the internal-combustion-engine control section 31 is capable of switching between torque control and rotational speed control of the internal combustion engine 11 according to the traveling state of the vehicle 6. In this example, the torque control is the control of sending a command of the target torque to the internal combustion engine 11 to cause the internal combustion engine torque Te to follow the target torque. The rotational speed control is the control of sending a command of the target rotational speed to the internal combustion engine 11 and determining the target torque so as to cause the rotational speed of the internal combustion engine 11 to follow the target rotational speed.

For example, during normal traveling of the vehicle 6 (in this example, during traveling in a parallel assist mode described below; the same applies to the following description), the internal-combustion-engine control section 31 determines internal-combustion-engine required torque, which is the torque required for the internal combustion engine 11, out of vehicle required torque Td that is determined by a required-torque determining section 42 described below. Then, the internal-combustion-engine control section 31 performs the torque control by using the determined internal-combustion-engine required torque as the target torque. In the present embodiment, a rotating-electrical-machine control section 43 can perform the torque control by using as the target torque the torque according to an internal combustion engine torque command that is determined during slip power generation control described below.

The drive-device control unit 40 includes a drive-mode determining section 41, the required-torque determining section 42, the rotating-electrical-machine control section 43, a starting-clutch operation control section 44, a speed-change-mechanism operation control section 45, a slip power generation control section 46, and a required-power-generation-amount determining section 47.

The drive-mode determining section 41 is a function part that determines the drive mode of the vehicle 6. The drive-mode determining section 41 determines the drive mode to be established by the drive device 1, based on, e.g., the vehicle speed derived from the detection result of the output-shaft rotational speed sensor Se3, the accelerator operation amount detected by the accelerator-operation-amount detection sensor Se4, the amount of electric power in the electrical storage device 28 derived from the detection result of the state-of-charge detection sensor Se5, etc. At this time, the drive-mode determining section 41 refers to a mode selection map (not shown) that defines the relation between the drive mode and the vehicle speed, the accelerator operation amount, and the amount of stored electric power. The mode selection map is stored in a recording device such as a memory.

As shown in FIG. 2, in this example, the drive modes that can be selected by the drive-mode determining section 41 include an electric drive mode, a parallel drive mode, and a slip drive mode, and a stopped-state power generation mode. The parallel drive mode includes a parallel assist mode and a parallel power generation mode. The slip drive mode includes a slip assist mode, a first slip power generation mode, and a second slip power generation mode. Note that in FIG. 2, "○" in the column of each clutch CS, C1 means that each engagement device is brought into the direct-coupling engaged state, "Δ" means that each engagement device is brought into the slip engaged state, and "x" means that each engagement device is brought into the disengaged state. The "power running" in the column of the rotating electrical machine 12 means that torque assist is performed on the vehicle 6, or that no torque assist is performed and the vehicle 6 is merely idling.

As shown in FIG. 2, in the electric drive mode, the starting clutch CS is brought into the disengaged state, the first clutch C1 is brought into the direct-coupling engaged state, and the rotating electrical machine 12 performs power running. The control device 3 selects the electric drive mode to cause the vehicle 6 to travel only by the output torque (rotating electrical machine torque Tm) of the rotating electrical machine 12. In the parallel drive mode, both the starting clutch CS and the first clutch C1 are brought into the direct-coupling engaged state, and the rotating electrical machine 12 performs power running or generates electric power. The control device 3 selects the parallel drive mode to cause the vehicle 6 to travel by at least the internal combustion engine torque Te. At this time, the rotating electrical machine 12 outputs positive rotating electrical machine torque Tm (>0) in the parallel assist mode to assist the driving force from the internal combustion engine torque Te, and outputs negative rotating electrical machine torque Tm (<0) in the parallel power generation mode to generate electric power by a part of the internal combustion engine torque Te.

In the slip assist mode, both the starting clutch CS and the first clutch C1 are brought into the slip engaged state, and the rotating electrical machine 12 performs power running. The control device 3 selects the slip assist mode to cause the vehicle 6 to travel by at least the internal combustion engine torque Te. In the first slip power generation mode, both the starting clutch CS and the first clutch C1 are brought into the slip engaged state, and the rotating electrical machine 12 generates electric power. In the second slip power generation mode, the starting clutch CS is brought into the slip engaged state, the first clutch C1 is brought into the direct-coupling engaged state, and the rotating electrical machine 12 generates electric power. The control device 3 selects one of the two slip power generation modes to cause the vehicle 6 to travel while causing the rotating electrical machine 12 to generate electric power by using the internal combustion engine torque Te. In the stopped-state power generation mode, the starting clutch CS is brought into the direct-coupling engaged state, the first clutch C1 is brought into the disengaged state, and the rotating electrical machine 12 generates electric power. The control device 3 selects the stopped-state power generation mode to cause the rotating electrical machine 12 to generate electric power by the internal combustion engine torque Te in the stopped state of the vehicle 6. Note that a configuration having only at least one of these drive modes or a configuration including a drive mode other than these drive modes may be used.

The required-torque determining section 42 is a function part that determines the vehicle required torque Td that is required in order to cause the vehicle 6 to travel. The required-torque determining section 42 determines the vehicle required torque Td by referring to a predetermined map (not shown) etc., based on the vehicle speed derived from the detection result of the output-shaft rotational speed sensor Se3, and the accelerator operation amount detected by the accelerator-operation-amount detection sensor Se4. According to the present embodiment, the vehicle required torque Td functions as a "required driving force" in the present invention. The determined vehicle required torque Td is output to the internal-combustion-engine control section 31, the rotating-electrical-machine control section 43, and the slip power generation control section 46, etc.

The rotating-electrical-machine control section 43 is a function part that performs operation control of the rotating electrical machine 12. The rotating-electrical-machine control section 43 performs the operation control of the rotating electrical machine 12 by determining target torque and target rotational speed as a control target of the rotating electrical machine torque Tm and the rotational speed, and operating the rotating electrical machine 12 according to this control target. In the present embodiment, the rotating-electrical-machine control section 43 is capable of switching between torque control and rotational speed control of the rotating electrical machine 12 according to the traveling state of the vehicle 6. In this example, the torque control is the control of sending a command of the target torque to the rotating electrical machine 12 to cause the rotating electrical machine torque Tm to follow the target torque. The rotational speed control is the control of sending a command of the target rotational speed to the rotating electrical machine 12 and determining the target torque so as to cause the rotational speed of the rotating electrical machine 12 to follow the target rotational speed.

For example, during normal traveling of the vehicle 6, the rotating-electrical-machine control section 43 determines rotating-electrical-machine required torque, which is the torque required for the rotating electrical machine 12, out of the vehicle required torque Td that is determined by the required-torque determining section 42. Then, the rotating-electrical-machine control section 43 controls the rotating electrical machine torque Tm by using the determined rotating-electrical-machine required torque as the target torque. In the present embodiment, the rotating-electrical-machine control section 43 can perform the rotational speed control of the rotating electrical machine 12 by using as the target rotational speed a target rotational speed Nmt that is determined during the slip power generation control described below.

The rotating-electrical-machine control section 43 can cause the rotating electrical machine 12 to generate electric power, by sending a command of negative target torque to cause the rotating electrical machine 12 to output negative rotating electrical machine torque Tm (<0). That is, since the rotating electrical machine 12 basically rotates in a positive direction during forward traveling of the vehicle 6, the rotating electrical machine 12 outputs the negative rotating electrical machine torque Tm (<0) and generates electric power while rotating in the positive direction As described above, the present embodiment is configured to cause the rotating electrical machine 12 to generate electric power by a part of the internal combustion engine torque Te in, e.g., the first slip power generation mode etc., and the "power generation torque Tg" herein refers to the torque for causing the rotating electrical machine 12 to generate electric power. This power generation torque Tg is equal to the absolute value of the negative rotating electrical machine torque Tm (<0).

The starting-clutch operation control section 44 is a function part that controls operation of the starting clutch CS. In this example, the starting-clutch operation control section 44 controls operation of the starting clutch CS by controlling the oil pressure supplied to the starting clutch CS via the hydraulic control device 25, and controlling the engagement pressure of the starting clutch CS. For example, the starting-clutch operation control section 44 brings the starting clutch CS into the disengaged state by outputting an oil-pressure command value Pcs for the starting clutch CS and controlling the oil pressure to be supplied to the starting clutch CS to the disengagement pressure via the hydraulic control device 25. The starting-clutch operation control section 44 brings the starting clutch CS into the direct-coupling engaged state by controlling the oil pressure to be supplied to the starting clutch CS to the full engagement pressure via the hydraulic control device 25. The starting-clutch operation control section 44 brings the starting clutch CS into the slip engaged state by controlling the oil pressure to be supplied to the starting clutch CS to a slip engagement pressure in the range from the disengagement boundary pressure to the engagement boundary pressure, both inclusive, via the hydraulic control device 25.

When the starting cutch CS is in the slip engaged state, the driving force is transmitted between the input shaft I and the intermediate shaft M in the state in which the input shaft I and the intermediate shaft M rotate relative to each other. Note that the magnitude of the torque that can be transferred when the starting clutch CS is in the direct-coupling engaged state or the slip engaged state is determined according to the engagement pressure of the starting clutch CS at that time. The magnitude of the torque at this time is herein referred to as the "transfer torque capacity Tcs" of the starting clutch CS. In the present embodiment, the engagement pressure and the transfer torque capacity Tcs can be continuously controlled to be increased or decreased by continuously controlling the amount of oil and the magnitude of oil pressure to be supplied to the starting clutch CS by a proportional solenoid etc. according to the oil-pressure command value Pcs for the starting clutch CS. Note that the transfer direction of the torque that is transferred via the starting clutch CS in the state in which the starting clutch CS is in the slip engaged state is determined according to the direction of the relative rotation between the input shaft I and the intermediate shaft M.

In the present embodiment, the starting-clutch operation control section 44 is capable of switching between torque control and rotational speed control of the starting clutch CS according to the traveling state of the vehicle 6. In this example, the torque control is the control of controlling the transfer torque capacity Tcs of the starting clutch CS to predetermined transfer torque capacity. The rotational speed control is the control of determining the oil-pressure command value Pcs for the starting clutch CS or the target transfer torque capacity of the starting clutch CS so as to cause the rotational speed difference between the rotational speed of a rotating member (in this example, the input shaft I) coupled to one engagement member of the starting clutch CS and the rotational speed of a rotating member (in this example, the intermediate shaft M) coupled to the other engagement member of the starting clutch CS to follow a predetermined target differential rotational speed.

The speed-change-mechanism operation control section 45 is a function part that controls operation of the speed change mechanism 13. The speed-change-mechanism operation control section 45 performs control of determining a target shift speed based on the accelerator operation amount and the vehicle speed and forming the determined target shift speed for the speed change mechanism 13. At this time, the speed-change-mechanism operation control section 45 refers to a shift map (not shown) that defines the relation between the target shift speed and the vehicle speed and the accelerator operation amount. The shift map is stored in a recording device such as a memory. The shift map is a map that sets a shift schedule based on the accelerator operation amount and the vehicle speed. The speed-change-mechanism operation control section 45 forms the target shift speed by controlling the oil pressure to be supplied to a predetermined friction engagement device included in the speed change mechanism 13 based on the determined target shift speed.

As described above, the speed change mechanism 13 includes the first clutch C1 for shifting. When in, e.g., the direct-coupling engaged state, this first clutch C1 and a one-way clutch cooperate to form a first shift speed. It is to be understood that the first clutch C1 is included in the elements to be controlled by the speed-change-mechanism operation control section 45. In this example, a first-clutch operation control section 45a is particularly a function part that controls operation of the first clutch C1. The first-clutch operation control section 45a controls operation of the first clutch C1 by controlling the oil pressure to be supplied to the first clutch C1 via the hydraulic control device 25 and controlling the engagement pressure of the first clutch C1. For example, the first-clutch operation control section 45a brings the first clutch C1 into the disengaged state by outputting an oil-pressure command value Pc1 for the first clutch C1 and controlling the oil pressure to be supplied to the first clutch C1 to the disengagement pressure via the hydraulic control device 25. The first-clutch operation control section 45a brings the first clutch C1 into the direct-coupling engaged state by controlling the oil pressure to be supplied to the first clutch C1 to the full engagement pressure via the hydraulic control device 25. The first-clutch operation control section 45a brings the first clutch C1 into the slip engaged state by controlling the oil pressure to be supplied to the first clutch C1 to the slip engagement pressure via the hydraulic control device 25.

When the first cutch C1 is in the slip engaged state, the driving force is transmitted between the intermediate shaft M and the shift intermediate shaft S in the state in which the intermediate shaft M and the shift intermediate shaft S rotate relative to each other. Note that the magnitude of the torque that can be transferred when the first clutch C1 is in the direct-coupling engaged state or the slip engaged state is determined according to the engagement pressure of the first clutch C1 at that time. The magnitude of the torque at this time is herein referred to as the "transfer torque capacity Tc1" of the first clutch C1. In the present embodiment, the engagement pressure and the transfer torque capacity Tc1 can be continuously controlled to be increased or decreased by continuously controlling the amount of oil and the magnitude of oil pressure to be supplied to the first clutch C1 by a proportional solenoid etc. according to the oil-pressure command value Pc1 for the first clutch C1. Note that the transfer direction of the torque that is transferred via the first clutch C1 in the state in which the first clutch C1 is in the slip engaged state is determined according to the direction of the relative rotation between the intermediate shaft M and the shift intermediate shaft S.

In the present embodiment, the first-clutch operation control section 45a is capable of switching between torque control and rotational speed control of the first clutch C1 according to the traveling state of the vehicle 6. In this example, the torque control is the control of controlling the transfer torque capacity Tc1 of the first clutch C1 to predetermined transfer torque capacity. The rotational speed control is the control of determining the oil-pressure command value Pc1 for the first clutch C1 or the target transfer torque capacity of the first clutch C1 so as to cause the rotational speed difference between the rotational speed of a rotating member (in this example, the intermediate shaft M) coupled to one engagement member of the first clutch C1 and the rotational speed of a rotating member (in this example, the shift intermediate shaft S) coupled to the other engagement member of the first clutch C1 to follow a predetermined target differential rotational speed.

The slip power generation control section 46 is a function part that performs predetermined slip power generation control. In the present embodiment, the "slip power generation" is the control of causing the rotating electrical machine 12 to generate electric power at least by the internal combustion engine torque Te that is transferred to the input shaft I when the starting clutch CS is in the slip engaged state. The slip power generation control is performed by cooperative operation of the internal-combustion-engine control section 31, the rotating-electrical-machine control section 43, the starting-clutch operation control section 44, the first-clutch operation control section 45a, etc. by using the slip power generation control section 46 as a core. The slip power generation control will be described in detail later.

The required-power-generation-amount determining section 47 is a function part that determines a required power generation amount Gd, which is the amount of electric power to be generated by the rotating electrical machine 12, when the drive mode is the stopped-state power generation mode, the first slip power generation mode, the second slip power generation mode, or the parallel power generation mode. In the present embodiment, auxiliary machines that are provided in the vehicle 6 and that are driven by using electric power (e.g., a compressor of an on-vehicle air conditioner, an oil pump for power steering, a water pump of cooling water for the internal combustion engine 11, lamps, etc.) are basically driven by the electric power generated by the rotating electrical machine 12. Accordingly, in the present embodiment, the required-power-generation-amount determining section 47 determines the required power generation amount Gd based on the rated power consumption of the auxiliary machines provided in the vehicle 6. That is, the required-power-generation-amount determining section 47 determines the required power generation amount Gd as the total rated power consumption obtained by integrating the rated power consumption that is set in advance for each auxiliary machine. In this example, the required power generation amount Gd that is determined in this manner is also set in advance according to the type of auxiliary machine mounted on the vehicle 6. The determined required power generation amount Gd is output to the slip power generation control section 46 etc.

1-3. Contents of Slip Power Generation Control

The specific contents of the slip power generation control that is performed by using the slip power generation control section 46 as a core will be described below with reference to FIG. 3. The slip power generation control is the control of causing the rotating electrical machine 12 to generate electric power when the input shaft I is driven by the internal combustion engine 11 and at least the starting clutch CS is in the slip engaged state. In this example, the slip power generation control is performed during the period of time T02 to T 08 in FIG. 3. In the present embodiment, the slip power generation control in the state in which the rotational speed of the output shaft O is equal to or less than a predetermined value is particularly referred to as the "specific slip power generation control." In this example, this specific slip power generation control is performed during the period of time T02 to T06 in FIG. 3. Note that in the present embodiment, the slip power generation control other than the specific slip power generation control is referred to as the "normal slip power generation control (time T06 to T08)."

Note that in the following description, the "first differential rotational speed ΔN1" refers to the differential rotational speed between the engagement devices on both sides of the starting clutch CS, namely the difference in the rotational speed between the input shaft I and the intermediate shaft M. The slip power generation control section 46 is capable of obtaining the first differential rotational speed ΔN1 as a difference obtained by subtracting the rotational speed of the intermediate shaft M detected by the intermediate-shaft rotational speed sensor Se2 from the rotational speed of the input shaft I detected by the input-shaft rotational speed sensor Se1. When the starting clutch CS is in the direct-coupling engaged state, the input shaft I and the intermediate shaft M rotate together. Accordingly, there is no first differential rotational speed ΔN1 (the first differential rotational speed ΔN1 is zero). On the other hand, when the starting clutch CS is in the slip engaged state or the disengaged state, the input shaft I and the intermediate shaft M rotate relative to each other. Accordingly, there is the first differential rotational speed ΔN1 (the first differential rotational speed ΔN1 is larger than zero).

The "second differential rotational speed ΔN2" refers to the differential rotational speed between the engagement devices on both sides of the first clutch C1, namely the difference in the rotational speed between the intermediate shaft M and the shift intermediate shaft S. The slip power generation control section 46 is capable of obtaining the second differential rotational speed ΔN2 as a difference obtained by subtracting the rotational speed of the shift intermediate shaft S, which is determined based on the rotational speed of the output shaft O detected by the output-shaft rotational speed sensor Se3, from the rotational speed of the intermediate shaft M detected by the intermediate-shaft rotational speed sensor Se2. Note that the rotational speed of the shift intermediate shaft S can be calculated as a product of the rotational speed of the output shaft O and the speed ratio of the shift speed formed in the speed change mechanism 13 (the same applies to the following description). When the first clutch C1 is in the direct-coupling engaged state, the intermediate shaft M and the shift intermediate shaft S rotate together. Accordingly, there is no second differential rotational speed ΔN2 (the second differential rotational speed ΔN2 is zero). On the other hand, when the first clutch C1 is in the slip engaged state or the disengaged state, the intermediate shaft M and the shift intermediate shaft S rotate relative to each other. Accordingly, there is the second differential rotational speed ΔN2 (the second differential rotational speed ΔN2 is larger than zero).

In the present embodiment, the slip power generation control is performed in a predetermined low vehicle speed state. In the present embodiment, the "low vehicle speed state" refers to the state in which an estimated rotational speed of the input shaft I (the internal combustion engine 11), which is estimated on the assumption that both the starting clutch CS and the first clutch C1 are in the direct-coupling engaged state when the first shift speed is formed in the speed change mechanism 13, is equal to or less than a predetermined first determination threshold value X1. In this example, it is determined that the current state is the low vehicle speed state, if the estimated rotational speed of the intermediate shaft M and the input shaft I, which is derived as a product of the rotational speed of the output shaft O detected by the output-shaft rotational speed sensor Se3 and the speed ratio of the first shift speed, is equal to or less than the first determination threshold value X1. The internal combustion engine 11 drivingly coupled to the input shaft I so as to rotate therewith needs to rotate at a certain speed or more in order to output the predetermined internal combustion engine torque Te to continue its self-sustained operation. The internal combustion engine 11 also needs to rotate at the certain speed or more in order to suppress generation of booming noise and vibration. The first determination threshold value X1 is set in view of the above. Such a first determination threshold value X1 may be, e.g., 800 to 1,200 [rpm] etc.

In the present embodiment, the specific slip power generation control is performed in a specific low vehicle speed state in which the vehicle speed is lower in the low vehicle speed state. In the present embodiment, the "specific low vehicle speed state" refers to the state in which an estimated rotational speed of the intermediate shaft M (the rotating electrical machine 12), which is estimated on the assumption that the first clutch C1 is in the direct-coupling engaged state when the first shift speed is formed in the speed change mechanism 13, is less than a predetermined second determination threshold value X2 that is smaller than the first determination threshold value X1. In this example, it is determined that the current state is the specific low vehicle speed state, if the estimated rotational speed of the intermediate shaft M, which is derived as a product of the speed of the output shaft O detected by the output-shaft rotational speed sensor Se3 and the speed ratio of the first shift speed, is less than the second determination threshold value X2. The magnitude of the torque (including both positive torque and negative torque) that can be output from the rotating electrical machine 12 drivingly coupled to the intermediate shaft M so as to rotate therewith has an upper limit, the rotating electrical machine 12 needs to rotate at a certain speed or more in order to secure a certain amount of power generation (in this example, the required power generation amount Gd that is determined by the required-power-generation-amount determining section 47). The second determination threshold value X2 is set in view of the above. Such a second determination threshold value X2 may be, e.g., 400 to 800 [rpm] etc. In the present embodiment, the specific low vehicle speed state functions as a "first specific traveling state" according to the present invention, and the low vehicle speed state other than the specific low vehicle speed state functions as a "second specific traveling state" according to the present invention. The second determination threshold value X2 functions as a "required rotational speed" in the present invention.

In the present embodiment, during traveling at a very low vehicle speed close to zero, such as, e.g., when the vehicle 6 is started to travel, the estimated rotational speed of the intermediate shaft M becomes less than the second determination threshold value X2, and the specific slip power generation control is performed. The normal slip power generation control is performed if the vehicle speed increases and the estimated rotational speed of the intermediate shaft M and the input shaft I becomes equal to or higher than the second determination threshold value X2 and less than the first determination threshold value X1 accordingly. The contents of the control will be described along the time axis, with respect to an example in which the vehicle 6 is started to travel from the stopped state in which electric power is generated.

1-3-1. Stopped-State Power Generation Control (Time T01 to T02)

Stopped-state power generation control is the control that is performed when the stopped-state power generation mode is selected. As shown in FIG. 2, when the stopped-state power generation mode is selected, the starting clutch CS is brought into the direct-coupling engaged state, the first clutch C1 is brought into the disengaged state, and the rotating electrical machine 12 generates electric power by the internal combustion engine torque Te. During the stopped-state power generation control, the torque control is performed on the internal combustion engine 11, and the rotational speed control is performed on the rotating electrical machine 12. In the example shown in FIG. 3, the internal combustion engine 11 and the rotating electrical machine 12, which rotate together, rotate at an idle speed Ni. The torque (the power generation torque Tg) that is applied to the rotating electrical machine 12 is determined based on the required power generation amount Gd determined by the required-power-generation-amount determining section 47 and the idle speed Ni, and the internal combustion engine is controlled to output the internal combustion engine torque Te corresponding to the power generation torque Tg. Thus, during the stopped-state power generation control, the rotating electrical machine 12 generates electric power enough to provide the required power generation amount Gd, by using the entire internal combustion engine torque Te. Note that the rotational speed of the internal combustion engine 11 and the rotating electrical machine 12 which rotate together may be changed according to the required power generation amount Gd.

During the stopped-state power generation control, the starting clutch CS is maintained in the direct-coupling engaged state, and is maintained in the state in which there is no first differential rotational speed $\Delta N1$. On the other hand, the first clutch C1 is maintained in the disengaged state, and has a large second differential rotational speed $\Delta N2$ with transmission of the driving force being interrupted. Note that the second differential rotational speed $\Delta N2$ at this time is equal to the idle speed Ni as the rotational speed of the internal combustion engine 11 and the rotating electrical machine 12 which rotate together. The slip power generation control is started if the driver performs a starting operation (in this example, an increase in the accelerator operation amount associated with the operation of stepping on the accelerator pedal 17) in this state.

1-3-2. Specific Slip Power Generation Control (Time T02 to T06)

In the initial stage of the slip power generation control, the first slip power generation mode is selected to perform the specific slip power generation control. As shown in FIG. 2, when the first slip power generation mode is selected, both the starting clutch CS and the first clutch C1 are brought into the slip engaged state, and the vehicle 6 travels while the rotating electrical machine 12 generate electric power by the internal combustion engine torque Te. As shown in FIG. 3, in the present embodiment, the specific slip power generation control has three control regions, namely a pre-control region DP, a first control region D1, and a second control region D2, in this order.

The pre-control region DP (time T02 to T03) is a control region of a preparatory stage for starting substantial specific slip power generation control. In the pre-control region DP, the oil-pressure command value PO for the first clutch C1 is first set to a value corresponding to a preliminary filling pressure and then maintained at a value corresponding to the disengagement boundary pressure. The oil-pressure command value Pcs for the starting clutch CS is gradually reduced from a value higher than the disengagement boundary pressure at a constant rate of change with time. In the pre-control region DP, the first differential rotational speed $\Delta N1$ is maintained at zero, and the second differential rotational speed $\Delta N2$ is maintained at a value equal to the idle speed Ni. In this state, the slip power generation control section 46 monitors whether the starting clutch CS has been brought into the slip engaged state or not, namely whether the first differential rotational speed $\Delta N1$ has become larger than zero or not. The substantial specific slip power generation control (in the present embodiment, the first control region D1 and the second control region D2) is started when the starting clutch CS is brought into the slip engaged state.

In the first control region D1 and the second control region D2, the torque control is performed on the internal combustion engine 11, the rotational speed control is performed on the rotating electrical machine 12, and the torque control is performed on the starting clutch CS and the first clutch C1.

In the first control region D1 (time T03 to T04), the rotating-electrical-machine control section 43 performs the rotational speed control of sending a command of the target rotational speed Nmt to the rotating electrical machine 12 to cause the rotational speed of the rotating electrical machine 12 to follow the target rotational speed Nmt. More specifically, the rotating-electrical-machine control section 43 performs feedback control of increasing or decreasing the target torque so that the rotational speed of the rotating electrical machine 12 becomes equal to the target rotational speed Nmt. In the present embodiment, the target rotational speed Nmt in the rotational speed control of the rotating electrical machine 12 is mainly determined based on the rotational speeds of the input shaft I and the output shaft O, the required power generation amount Gd, the amount of heat generation of the rotating electrical machine 12, and the cooling performance thereof.

In the present embodiment, the target rotational speed Nmt of the rotating electrical machine 12 may be set to a value that is lower than the rotational speed of input shaft I and higher than the rotational speed of the output shaft O. This allows the slip engaged state of both the starting clutch CS and the first clutch C1 to be appropriately implemented. The target rotational speed Nmt is set to a value that is equal to or higher than at least the second determination threshold value X2 described above. This allows the rotating electrical machine 12 to appropriately secure the required power generation amount Gd regardless of the restriction of the magnitude of the negative rotating electrical machine torque Tm (<0) that can be output by the rotating electrical machine 12.

Figure 4:
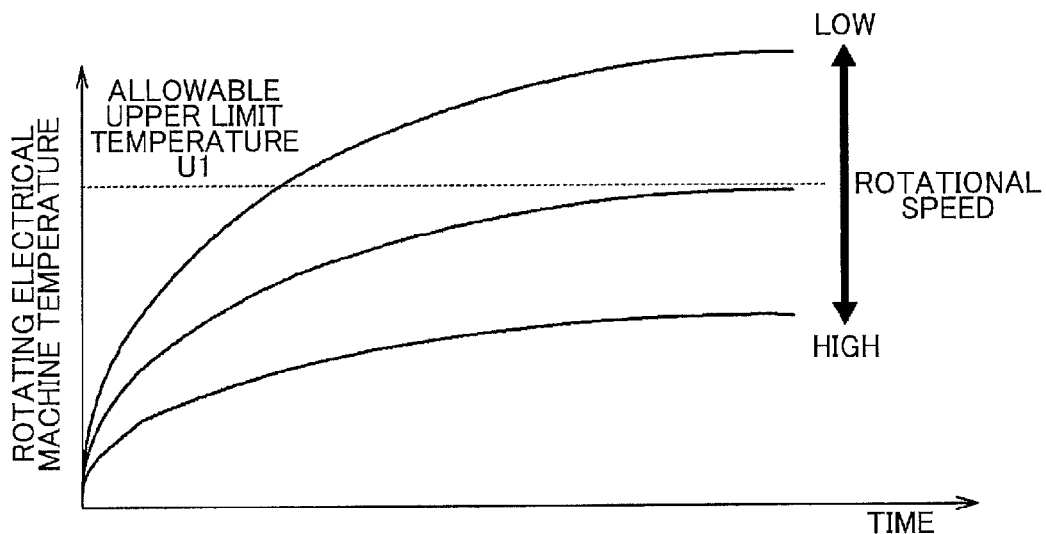
FIG. 4 is a diagram showing an example of a method of determining a target rotational speed of a rotating electrical machine.

FIG. 4 is a diagram showing an example of a method of determining the target rotational speed Nmt. FIG. 4 shows the relation between the elapsed time and the temperature of the rotating electrical machine 12 (including the rotor, a stator coil, etc.) according to the rotational speed of the rotating electrical machine 12. As shown in this figure, the temperature of the rotating electrical machine 12 increases with time, and is converged at a predetermined temperature after a lapse of sufficient time. In this case, the convergence temperature of the rotating electrical machine 12 increases as the rotational speed of the rotating electrical machine 12 decreases. The reason for this is as follows. The amount of heat generation of the rotating electrical machine 12 is proportional to the current flowing in the stator coil of the rotating electrical machine 12. In order to secure a certain amount of power generation (in this example, the required power generation amount Gd), the absolute value (the power generation torque Tg) of the negative rotating electrical machine torque Tm increases and the current value flowing in the stator coil of the rotating electrical machine 12 increases as the rotational speed of the rotating electrical machine 12 decreases. Note that if the rotational speed has a specific value, the convergence temperature of the rotating electrical machine 12 varies depending on the cooling performance of the rotating electrical machine 12 that is determined based on the temperature, amount, etc. of a cooling medium (oil, air, etc.) that is supplied to the rotating electrical machine 12. The convergence temperature of the rotating electrical machine 12 also varies depending on the physical size of the rotating electrical machine 12, etc.

In this example, an allowable upper limit temperature U1 that is provided to allow the rotating electrical machine 12 to operate continuously is set for the rotating electrical machine 12. This allowable upper limit temperature U1 is set to such a temperature that can prevent performance degradation (e.g., irreversible demagnetization of a permanent magnet, etc. in the case where the rotor of the rotating electrical machine 12 has a permanent magnet-embedded configuration) due to overheating of the rotating electrical machine 12. In the present embodiment, the target rotational speed Nmt is determined based on this allowable upper limit temperature U1 of the rotating electrical machine 12. That is, such a rotational speed of the rotating electrical machine 12 is calculated that does not allow the convergence temperature of the rotating electrical machine 12 to exceed the acceptable upper limit temperature U1 even if sufficient time passes with that state being maintained, and this value is determined as the target rotational speed Nmt. In the first control region D1, the rotating-electrical-machine control section 43 sends a command of the target rotational speed Nmt determined in this manner to the rotating electrical machine 12, and performs the rotational speed control to cause the rotational speed of the rotating electrical machine 12 to follow the target rotational speed Nmt.

Note that in the first control region D1, the rotational speed of the rotating electrical machine 12 is not equal to the target rotational speed Nmt. Accordingly, in the first control region D1, the rotating electrical machine torque Tm is set so that the absolute value thereof is equal to the sum of the power generation torque Tg derived from the required power generation amount Gd and inertia torque Ti for reducing the rotational speed of the rotating electrical machine 12 toward the target rotational speed Nmt. Note that the power generation torque Tg is derived as a value obtained by dividing the required power generation amount Gd by the target rotational speed Nmt. In this manner, in the first control region D1, the rotating-electrical-machine control section 43 controls the rotating electrical machine 12 so that the rotating electrical machine 12 outputs the negative rotating electrical machine torque Tm (<0) corresponding to the sum of the power generation torque Tg and the inertia torque Ti.

In the first control region D1, the internal-combustion-engine control section 31 performs the torque control of sending a command of the target torque to the internal combustion engine 11 to cause the internal combustion engine torque Te to follow this target torque. In the present embodiment, the target torque (the internal combustion engine torque command) of the internal combustion engine 11 is set to the sum of the vehicle required torque Td and the power generation torque Tg. Thus, the internal-combustion-engine control section 31 sends a command of the target torque equal to the sum of the vehicle required torque Td and the power generation torque Tg to perform the torque control, thereby causing the internal combustion engine 11 to output the internal combustion engine torque Te Tg+Td) that is equal to the sum of the vehicle required torque Td and the power generation torque Tg (the same applies to the second control region D2). Note that in the first control region D1 in the illustrated example, the vehicle required torque Td increases in response to the operation of stepping on the accelerator pedal 17 by the driver, and the internal combustion engine torque Te increases with a slight delay from the increase in the vehicle required torque Td.

In the first control region D1, the starting-clutch operation control section 44 performs the torque control of controlling the transfer torque capacity Tcs of the starting clutch CS to a predetermined target transfer torque capacity. In the present embodiment, the target value of the transfer torque capacity Tcs is set to be equal to the internal combustion engine torque Te. That is, in the first control region D1, the starting-clutch operation control section 44 controls the engagement pressure of the starting clutch CS so as to control the transfer torque capacity Tcs of the starting clutch CS to the capacity according to the internal combustion engine torque Te (i.e., the sum of the vehicle required torque Td and the power generation torque Tg). Performing the torque control on the starting clutch CS in this manner allows the entire internal combustion engine torque Te that is transferred to the input shaft I to be transferred to the rotating electrical machine 12 side via the starting clutch CS (the same applies to the second control region D2).

In the first control region D1, the first-clutch operation control section 45a performs the torque control of controlling the transfer torque capacity Tc1 of the first clutch C1 to a predetermined target transfer torque capacity. In the present embodiment, the target value of the transfer torque capacity Tc1 is set to be equal to the vehicle required torque Td that is determined by the required-torque determining section 42. That is, in the first control region D1, the first-clutch operation control section 45a controls the engagement pressure of the first clutch C1 so as to control the transfer torque capacity Tc1 of the first clutch C1 to the capacity according to the vehicle required torque Td. Performing the torque control on the first clutch C1 in this manner allows a part of the internal combustion engine torque Te transferred to the intermediate shaft M, which has a magnitude corresponding to the vehicle required torque Td, to be transferred to the output shaft O on the wheels 5 side via the first clutch C1 (the same applies to the second control region D2).

Figure 3:
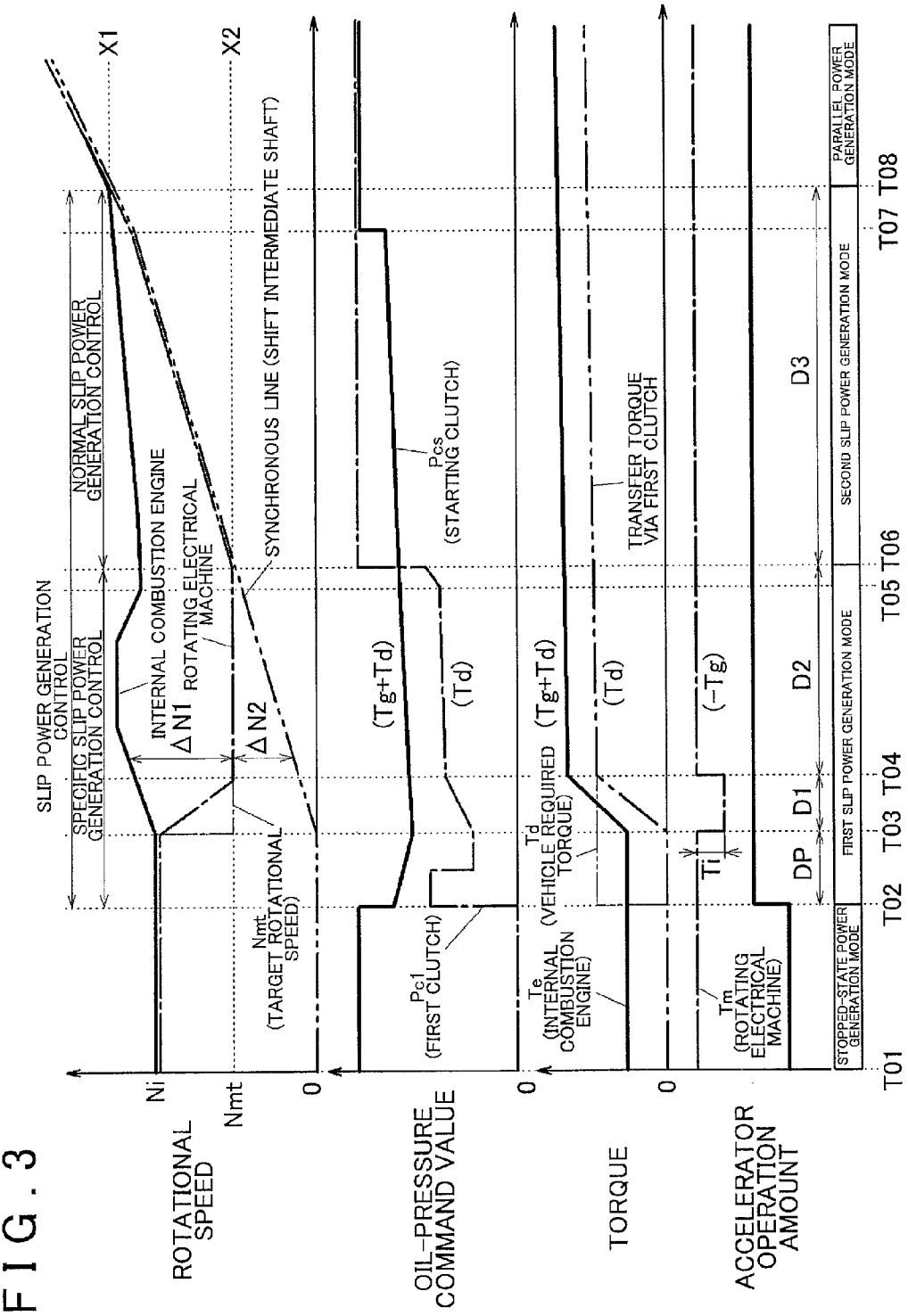
FIG. 3 is a timing chart showing an example of the operating state of each part at the time slip power generation control according to the first embodiment is performed.

As can be understood from FIG. 3, in this first control region D1, the first differential rotational speed ΔN1 is gradually increased and the second differential rotational speed ΔN2 is gradually decreased, with the starting clutch CS being in the slip engaged state. In the first control region D1, the slip power generation control section 46 monitors whether the rotational speed of the intermediate shaft M rotating with the rotating electrical machine 12 has reached the target rotational speed Nmt described above or not. The first control region D1 is performed until the rotational speed of the intermediate shaft M reaches the target rotational speed Nmt. The second control region D2 is started when the rotational speed of the intermediate shaft M becomes equal to the target rotational speed Nmt.

In the second control region D2 (time T04 to T06), as in the first control region D1, the rotating-electrical-machine control section 43 continues to perform the rotational speed control of sending a command of the target rotational speed Nmt to the rotating electrical machine 12 to cause the rotational speed of the rotating electrical machine 12 to follow the target rotational speed Nmt. However, in the second control region D2, the rotational speed of the rotating electrical machine 12 is already equal to the target rotational speed Nmt. Accordingly, the inertia torque Ti in the first control region D1 is eliminated, and the rotating electrical machine 12 outputs only the negative rotating electrical machine torque Tm (<0) corresponding to the power generation torque Tg. In the second control region D2, the internal-combustion-engine control section 31, the starting-clutch operation control section 44, and the first-clutch operation control section 45a control the internal combustion engine 11, the starting clutch CS, and the first clutch C1 in a manner similar to that in the first control region D1.

That is, in the second control region D2, the internal combustion engine 11 is controlled to output the internal combustion engine torque Te that is equal to the sum of the power generation torque Tg and the vehicle required torque Td, and the starting clutch CS is controlled so that the transfer torque capacity Tcs of the starting clutch CS becomes equal to the sum of the power generation torque Tg and the vehicle required torque Td. The rotating electrical machine 12 is controlled to rotate at the target rotational speed Nmt, and the power generation torque Tg is applied to the rotating electrical machine 12, whereby the rotating electrical machine 12 generates electric power enough to provide the required power generation amount Gd. Moreover, the first clutch C1 is controlled so that the transfer torque capacity Tc1 of the first clutch C1 becomes equal to the vehicle required torque Td. This allows the vehicle required torque Td to be transferred to the wheels 15 via the first clutch C1 and the output shaft O while securing the required power generation amount Gd by using the internal combustion engine torque Te, and thus allows the vehicle 6 to travel appropriately.

In the present embodiment, both the starting clutch CS and the first clutch C1 are maintained in the slip engaged state during the specific slip power generation control (except the pre-control region DP). Accordingly, the first differential rotational speed ΔN1 between the engagement members on both sides of the starting clutch CS and the second differential rotational speed ΔN2 between the engagement members on both sides of the first clutch C1 can be reduced under such conditions that the rotational speed of the input shaft I and the rotational speed of the output shaft O are the same. Accordingly, the amount of heat generation of the first clutch C1 can be reduced as compared to, e.g., the case where the starting clutch CS is brought into the direct-coupling engaged state and only the first clutch C1 is brought into the slip engaged state. This can suppress overheating of the first clutch C1, and can improve durability of the first clutch C1. Note that since the starting clutch CS is also brought into the slip engaged state in this case, the amount of heat generation of the starting clutch CS increases as compared to the case where the starting clutch CS is brought into the direct-coupling engaged state. However, this is not a problem in the present embodiment because the starting clutch CS is configured so that at least one of its cooling performance and heat resistance is higher than the first clutch C1, such as the entire starting clutch CS being always soaked in the oil in the clutch housing.

As can be understood from FIG. 3, in this second control region D2, in the state in which both the rotational speed of the output shaft O and the rotational speed of the shift intermediate shaft S proportional thereto increase, the rotational speed of the intermediate shaft M is maintained at the target rotational speed Nmt that is set to a constant value, whereby the second differential rotational speed ΔN2 is gradually decreased. Note that in this example, the first differential rotational speed ΔN1 is initially increased, is maintained at a substantially constant value, and then is gradually decreased, according to the change in the rotational speed of the input shaft I. In the second control region D2, the slip power generation control section 46 monitors whether the second differential rotational speed ΔN2 has been eliminated (in this example, whether the second differential rotational speed ΔN2 has become equal to or less than a predetermined value close to zero) or not. The second control region D2 is performed until the second differential rotational speed ΔN2 becomes equal to or less than the predetermined value. If the second differential rotational speed ΔN2 becomes equal to or less than the predetermined value at time T05, the first-clutch operation control section 45a gradually increases the oil pressure that is supplied to the first clutch C1, at a constant rate of change with time via the hydraulic control device 25. The first-clutch operation control section 45a increases the oil pressure that is supplied to the first clutch C1 to the full engagement pressure in a stepped manner at time T06, thereby bringing the first clutch C1 into a steady direct-coupling engaged state. As used herein, the "steady direct-coupling engaged state" refers to the state (the fully engaged state) in which the engagement members on both sides of the engagement device are engaged so as to rotate together, at the engagement pressure that does not cause slipping between the engagement members even by a variation in the torque that is transferred to the engagement device. Thus, the mode transitions from the first slip power generation mode to the second slip power generation mode, and a third control region D3 is started.

1-3-3. Normal Slip Power Generation Control (Time T06 to T08)

In a later stage of the slip power generation control, the second slip power generation mode is selected to perform the normal slip power generation control. As shown in FIG. 2, when the second slip power generation mode is selected, the starting clutch CS is brought into the slip engaged state, the first clutch C1 is brought into the direct-coupling engaged state, and the vehicle 6 travels while the rotating electrical machine 12 is generating electric power by the internal combustion engine torque Te. As shown in FIG. 3, in the present embodiment, the normal slip power generation control has one control region, namely the third control region D3.

In the third control region D3 (time T06 to T08), the torque control is performed on the internal combustion engine 11, and the torque control is performed on the starting clutch CS. In the third control region D3, since the first clutch C1 is brought into the direct-coupling engaged state, the rotating electrical machine 12 rotates at the rotational speed according to the vehicle speed (or the rotational speed of the output shaft O), with the intermediate shaft M and the shift intermediate shaft S rotating together. In the third control region D3, the internal-combustion-engine control section 31 and the starting-clutch operation control section 44 respectively control the internal combustion engine 11 and the starting clutch CS in a manner similar to that of the second control region D2.

That is, in the third control region D3, the internal combustion engine 11 is controlled to output the internal combustion engine torque Te that is equal to the sum of the power generation torque Tg and the vehicle required torque Td, and the starting clutch CS is controlled so that the transfer torque capacity Tcs of the starting clutch CS becomes equal to the sum of the power generation torque Tg and the vehicle required torque Td. The power generation torque Tg is applied to the rotating electrical machine 12 that rotates at a rotational speed equal to or higher than the target rotational speed Nmt, and the rotating electrical machine 12 generates electric power exceeding the required power generation amount Gd.

As can be understood from FIG. 3, in this third control region D3, in the state in which there is no second differential rotational speed ΔN2, the rotational speed of the output shaft O increases, and the first differential rotational speed ΔN1 gradually decreases. Note that the third control region D3 is advantageous in that the second differential rotational speed ΔN2 is maintained at zero with the first clutch C1 being in the direct-coupling engaged state, and thus no heat is generated in the first clutch C1. Moreover, in the third control region D3, the slip power generation control section 46 monitors whether the first differential rotational speed ΔN1 has been eliminated (in this example, whether the first differential rotational speed ΔN1 has become equal to or less than a predetermined value close to zero) or not. The third control region D3 is performed until the first differential rotational speed ΔN1 becomes equal to or less than the predetermined value. If the first differential rotational speed ΔN1 becomes equal to or less than the predetermined value at time T07, the starting-clutch operation control section 44 increases the oil pressure that is supplied to the starting clutch CS to the full engagement pressure in a stepped manner via the hydraulic control device 25, thereby bringing the starting clutch CS into the steady direct-coupling engaged state (the fully engaged state). Thus, the first differential rotational speed ΔN1 then becomes equal to zero with no delay, and the starting clutch CS is brought into the direct-coupling engaged state, whereby the mode transitions from the second slip power generation mode to the parallel power generation mode. Thereafter, in the parallel power generation mode, the vehicle 6 travels while generating electric power by the internal combustion engine torque Te.

Figure 5:
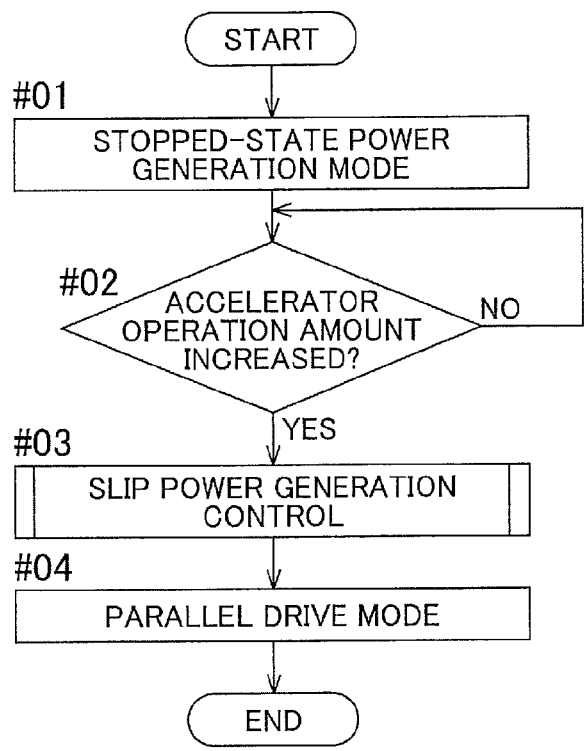
FIG. 5 is a flow chart showing processing procedures in vehicle control at the time a vehicle is started to travel from the stopped state in which electric power is generated.
Figure 6:
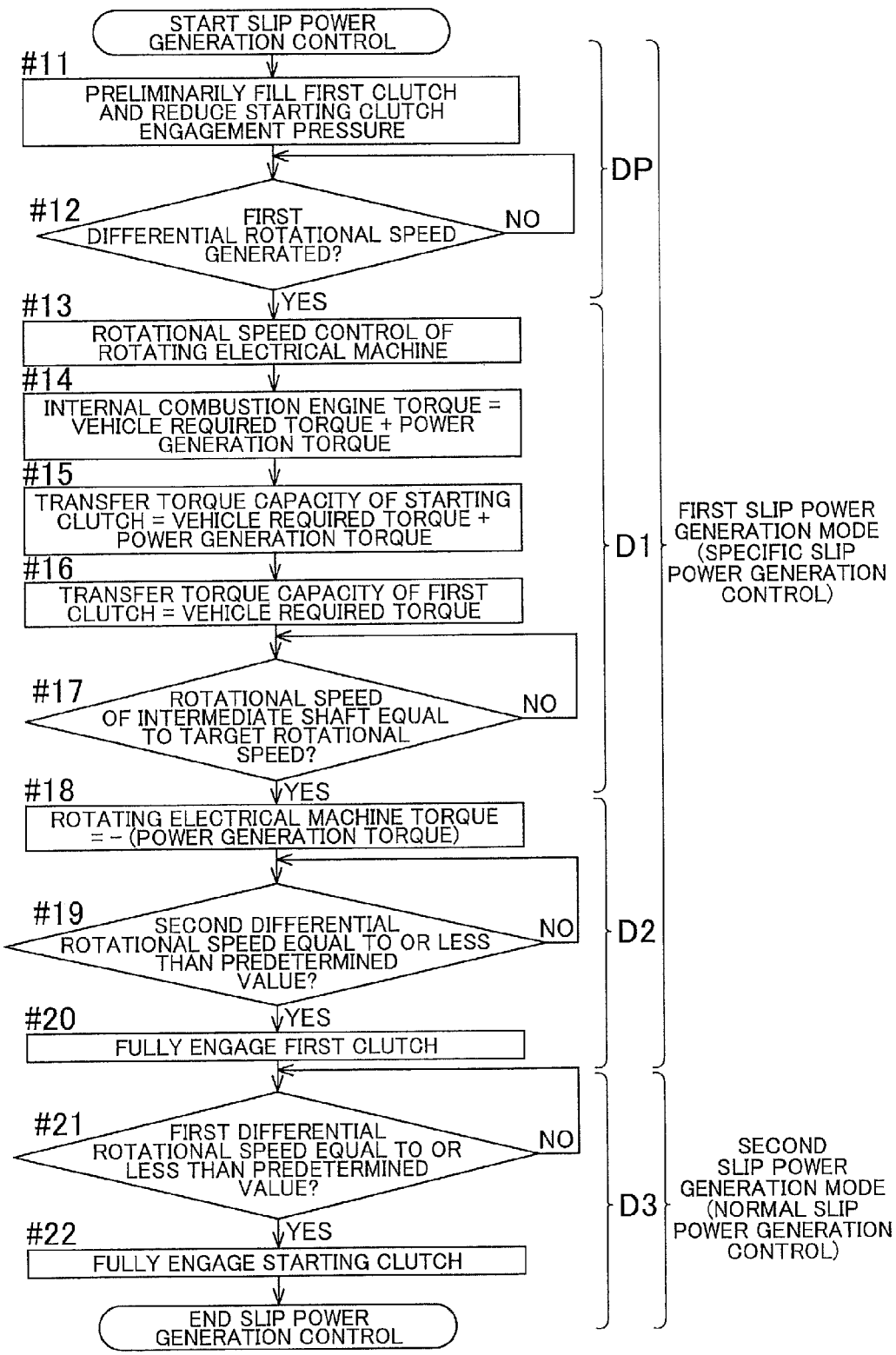
FIG. 6 is a flow chart showing detailed processing procedures of the slip power generation control.

1-4. Processing Procedures of Vehicle Start Control Including Slip Power Generation Control The processing procedures of the slip power generation control according to the present embodiment will be described with reference to the flowcharts of FIGS. 5 and 6. In this example, the processing procedures in the vehicle control (vehicle start control) that is performed when the vehicle 6 is started to travel from the stopped state in which electric power is generated are shown corresponding to the timing chart of FIG. 3. Note that FIG. 5 is a flow chart showing the overall processing procedures of the vehicle control, and FIG. 6 is a flow chart showing the detailed processing procedures of the slip power generation control in step #03 of FIG. 5. Each procedure of the vehicle start control including the slip power generation control described below is carried out by each function part of the control device 3. In the case where each function part is formed by the programs, the arithmetic processing unit included in the control device 3 operates as a computer that executes the programs forming each function part described above.

In the present embodiment, as shown in FIGS. 3 and 5, the stopped-state power generation mode is selected during the period of time T01 to T02, so that the rotating electrical machine 12 generates electric power in the stopped state of the vehicle 6 (step #01). In the stopped-state power generation mode, it is determined whether a starting operation has been performed by the driver or not, namely in this example, whether or not the accelerator operation amount detected by the accelerator-operation-amount detection sensor Se4 has increased to a predetermined value or more (step #02). If it is determined at time T02 that the accelerator operation amount has increased (step #02: Yes), the slip power generation control is performed (step #03).

In the slip power generation control, the first slip power generation mode is first selected, and as shown in FIGS. 3 and 6, in the pre-control region DP at time T02 to T03, the oil pressure that is supplied to the first clutch C1 is preliminarily filled, and the oil pressure that is supplied to the starting clutch CS is gradually decreased at a constant rate of change with time (step #11). In this state, it is determined whether the first differential rotational speed ΔN1 has become larger than zero (step #12). If it is determined at time T03 that the first difference revolution speed ΔN1 has been generated (step #12: Yes), the pre-control region DP is terminated, and the first control region D1 is started.

In the first control region D1, the rotational speed control of the rotating electrical machine 12 is performed (step #13). In this example, the rotating electrical machine 12 is controlled to output the inertia torque Ti in addition to the power generation torque Tg until the rotational speed of the rotating electrical machine 12 becomes equal to the target rotational speed Nmt (time T03 to T04). The internal combustion engine 11 is controlled to output the internal combustion engine torque Te that is equal to the sum of the vehicle required torque Td and the power generation torque Tg (step #14), and the engagement pressure of the starting clutch CS is controlled so that the transfer torque capacity Tcs of the starting clutch CS becomes equal to the internal combustion engine torque Te, namely to the sum of the vehicle required torque Td and the power generation torque Tg (step #15). The engagement pressure of the first clutch C1 is controlled so that the transfer torque capacity Tc1 of the first clutch C1 becomes equal to the vehicle required torque Td (step #16). In this state, it is determined whether the rotational speed of the intermediate shaft M that rotates with the rotating electrical machine 12 has become equal to the target rotational speed Nmt (step #17). If it is determined at time T04 that the rotational speed of the intermediate shaft M has become equal to the target rotational speed Nmt (step #17: Yes), the first control region D1 is terminated, and the second control region D2 is started.

In the second control region D2, the rotating electrical machine 12 is controlled to output only the negative rotating electrical machine torque Tm (<0) corresponding to the power generation torque Tg while rotating at the target rotational speed Nmt (step #18). In the second control region D2, in the state in which the second differential rotational speed ΔN2 is gradually decreasing, it is determined whether the second differential rotational speed ΔN2 has become equal to or less than a predetermined value or not (step #19). If it is determined at time T5 that the second differential rotational speed ΔN2 has become equal to or less than the predetermined value (step #19: Yes), the first clutch C1 is brought into the fully engaged state during time T05 to T06 (step #20), the second control region D2 is terminated, and the third control region D3 is started.

In the third control region D3, the second slip power generation mode is selected. In the state in which the first differential rotational speed ΔN1 is gradually decreasing, it is determined whether the first differential rotational speed ΔN1 has become equal to or less than a predetermined value or not (step #21). If it is determined at time T07 that the first differential rotational speed ΔN1 has become equal to or less than the predetermined value (step #21: Yes), the starting clutch CS is immediately brought into the fully engaged state (step #22). If the first differential rotational speed ΔN1 becomes equal to zero at time T08, the third control region D3 is terminated, and the slip power generation control is terminated, returning to the main flow. Then, the parallel drive mode (in this example, the parallel power generation mode) is selected as shown in FIGS. 3 and 5, and the vehicle 6 is made to travel while generating electric power by the internal combustion engine torque Te.

2. Second Embodiment

Figure 7:
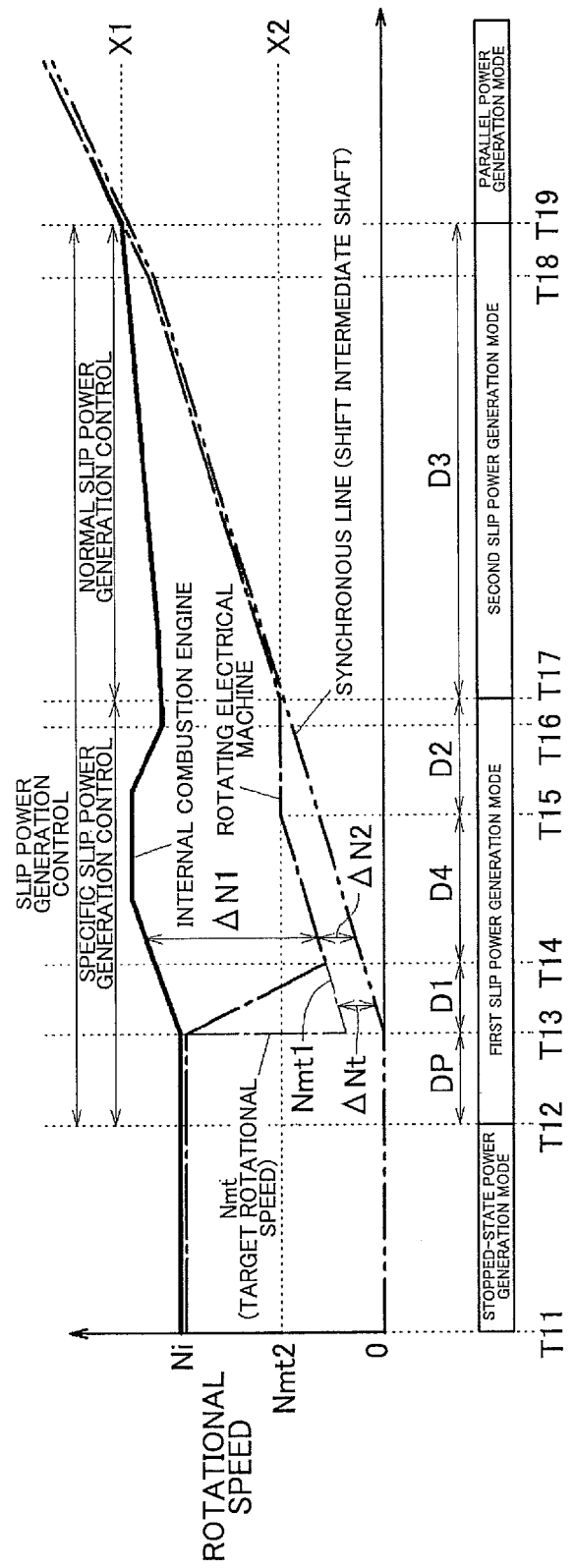
FIG. 7 is a timing chart showing an example of the operating state of each part at the time of slip power generation control according to a second embodiment is performed.

A second embodiment of the control device according to the present invention will be described below with reference to the drawings. FIG. 7 is a timing chart showing an example of the operating state of each part at the time the slip power generation control according to the present embodiment is performed. The present embodiment is partially different from the first embodiment in the specific control contents of the specific slip power generation control of the slip power generation control. Regarding the other components, the present embodiment is basically similar to the first embodiment. The control device 3 of the present embodiment will be described below mainly with respect to the differences from the first embodiment. The present embodiment is similar to the first embodiment unless otherwise specified.

In the present embodiment, the target rotational speed Nmt in the rotational speed control of the rotating electrical machine 12 during the specific slip power generation control is mainly determined based on the amount of heat generation and the cooling performance of the first clutch C1, in addition to the rotational speeds of the input shaft I and the output shaft O, the required power generation amount Gd, and the amount of heat generation and the cooling performance of the rotating electrical machine 12.

Figure 8:
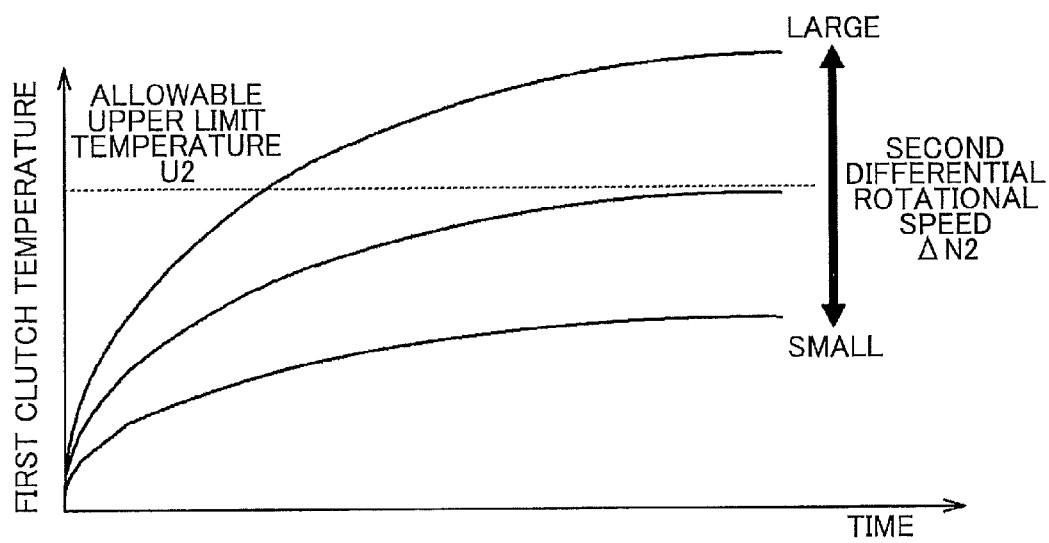
FIG. 8 is a diagram showing an example of a method of determining a target rotational speed of a rotating electrical machine.

FIG. 8 is a figure showing an example of a method of determining the target rotational speed Nmt. FIG. 8 shows the relation between the elapsed time and the temperature of the first clutch C1 according to the magnitude of the differential rotational speed (the second differential rotational speed $\Delta N2$) between the engagement members on both sides of the first clutch C1. As shown in this figure, the temperature of the first clutch C1 increases with time, and is converged at a predetermined temperature after a lapse of sufficient time. In this case, the convergence temperature of the first clutch C1 increases as the second differential rotational speed $\Delta N2$ increases. This is because the amount of heat generation of the first clutch C1 in the slip engaged state is proportional to the product of the torque (equal to the transfer torque capacity Tc1) that is transferred via the first clutch C1 and the second differential rotational speed $\Delta N2$. Note that if the second differential rotational speed $\Delta N2$ has a specific value, the convergence temperature of the first clutch C1 varies depending on the cooling performance of the first clutch C1 that is determined based on the temperature, amount, etc. of the oil that is supplied to the first clutch C1.

In this example, an allowable upper limit temperature U2 that is provided to allow the first clutch C1 to operate continuously is set for the first clutch C1. This allowable upper limit temperature U2 is set to such a temperature that can prevent performance degradation (e.g., change in characteristics of the transfer torque capacity Tc1 with respect to the engagement pressure) due to overheating of the first clutch C1. In the present embodiment, the target differential rotational speed $\Delta Nt$ as a target value of the second differential rotational speed $\Delta N2$ is determined based on this allowable upper limit temperature U2 of the first clutch C1. That is, such a second differential rotational speed $\Delta N2$ is calculated that does not allow the convergence temperature of the first clutch C1 to exceed the acceptable upper limit temperature U2 even if sufficient time passes with that state being maintained, and this value is determined as the target differential rotational speed $\Delta Nt$. The target rotational speed Nmt is determined based on at least the target differential rotational speed $\Delta Nt$ determined in this manner.

Specifically, in the present embodiment, as shown in FIG. 7, a first target rotational speed Nmt1 is determined as the sum of the rotational speed of the shift intermediate shaft S derived from the rotational speed of the output shaft O detected by the output-shaft rotational speed sensor Se3 and the target differential rotational speed $\Delta Nt$. In addition to this first target rotational speed Nmt1, the target rotational speed based on the allowable upper limit temperature U1 of the rotating electrical machine 12 is computed in a manner similar to that in the first embodiment, and this value is determined as a second target rotational speed Nmt2. In the present embodiment, a smaller one of the first target rotational speed Nmt1 and the second target rotational speed Nmt2 is determined as the target rotational speed Nmt. Note that in the state in which the rotational speed of the output shaft O is very low right after the vehicle 6 is started to travel, etc., the first target rotational speed Nmt1 is smaller than the second target rotational speed Nmt2. In the first control region D1, the rotating-electrical-machine control section 43 sends a command of the target rotational speed Nmt (a concept including the first target rotational speed Nmt1 and the second target rotational speed Nmt2) determined in this manner to the rotating electrical machine 12, and performs the rotational speed control to cause the rotational speed of the rotating electrical machine 12 to follow the target rotational speed Nmt.

In the present embodiment, the control contents of the internal combustion engine 11, the rotating electrical machine 12, the starting clutch CS, and the first clutch C1 in the first control region D1 is similar to those of the first embodiment. However, in the present embodiment, since the target rotational speed Nmt of the rotating electrical machine 12 is determined as described above in the first control region D1, the slip power generation control section 46 monitors in the first control region D1 whether the rotational speed of the intermediate shaft M rotating with the rotating electrical machine 12 has reached the first target rotational speed Nmt1 or not. In other words, in the state in which the second differential rotational speed $\Delta N2$ is decreasing, the slip power generation control section 46 monitors whether the second differential rotational speed $\Delta N2$ has reached the target differential rotational speed $\Delta Nt$ or not. The first control region D1 is performed until the second differential rotational speed $\Delta N2$ reaches the target differential rotational speed $\Delta Nt$. A fourth control region D4 is started when the second differential rotational speed $\Delta N2$ reaches the target differential rotational speed $\Delta Nt$.

In the fourth control region D4 (time T14 to T15), the rotating-electrical-machine control section 43 performs the rotational speed control of sending a command of the first target rotational speed Nmt1 to the rotating electrical machine 12 to cause the rotational speed of the rotating electrical machine 12 to follow the first target rotational speed Nmt1. That is, in the fourth control region D4, in the state in which the rotational speed of the output shaft O and the rotational speed of the shift intermediate shaft S proportional thereto increase, the slip power generation control section 46 increases the rotational speed of the intermediate shaft M according to the increase in the rotational speed of the output shaft O and the rotational speed of the shift intermediate shaft S, and maintains the second differential rotational speed $\Delta N2$ at the target differential rotational speed $\Delta Nt$. In the fourth control region D4, the slip power generation control section 46 monitors whether the rotational speed of the intermediate shaft M rotating with the rotating electrical machine 12 has reached the second target rotational speed Nmt2 or not. The fourth control region D4 is performed until the rotational speed of the intermediate shaft M reaches the second target rotational speed Nmt2. The second control region D2 is started when the rotational speed of the intermediate shaft M becomes equal to the second target rotational speed Nmt2. Thus, the specific slip power generation control according to the present embodiment has the fourth control region D4 between the first control region D1 and the second control region D2. That is, the specific slip power generation control according to the present embodiment has four control regions, namely the pre-control region DP, the first control region D1, the fourth control region D4, and the second control region D2, in this order.

Since the control contents in the second control region D2 in the specific slip power generation control and those in the third control region D3 in the normal slip power generation control are similar to those of the first embodiment, detailed description thereof will be omitted.

In the present embodiment as well, the vehicle required torque Td can be transferred to the wheels 15 via the first clutch C1 and the output shaft O and the vehicle 6 can be made to travel appropriately, while securing the required power generation amount Gd by using the internal combustion engine Te. Moreover, by reducing the amount of heat generation of the first clutch C1, overheating can be suppressed, and durability of the first clutch C1 can be improved. In the present embodiment, in the fourth control region D4, the rotational speed of the rotating electrical machine 12 is first made to follow the first target rotational speed Nmt1, and the second differential rotational speed ΔN2 is maintained at the target differential rotational speed ΔNt, whereby the second differential rotational speed ΔN2 is reduced relatively early. Thus, the specific slip power generation control according to the present embodiment can effectively reduce the amount of heat generation of the first clutch C1 and maintain satisfactory durability of the first clutch C1. Moreover, the desired required power generation amount Gd can be secured even in the specific traveling state (in particular, the specific low vehicle speed state in the present embodiment) such as when the vehicle 6 is made to travel at a low vehicle speed, while appropriately protecting both the rotating electrical machine 12 and the first clutch C1.

3. Other Embodiments

Lastly, other embodiments of the control device according to the present invention will be described. Note that the configurations disclosed in each of the following embodiments are applicable in combination with the configurations disclosed in the other embodiments as long as no inconsistency arises.

(1) Each of the above embodiments is described with respect to an example in which the target rotational speed Nmt is determined based on the required power generation amount Gd etc. in addition to the rotational speeds of the input shaft I and the output shaft O. However, embodiments of the present invention are not limited to these examples. That is, the target rotational speed Nmt need only be set to a value that is lower than the rotational speed of the input shaft I and higher than the rotational speed of the output shaft O, and it is also one of preferred embodiments of the present invention to set the target rotational speed Nmt to any value in this range. In this case, for example, a configuration can be used in which the target rotational speed Nmt is set to the rotational speed capable of securing the supply oil pressure that is required for both the starting clutch CS and the first clutch C1 by the oil pump drivingly coupled to the intermediate shaft M so as to rotate therewith. By using this configuration, the supply oil pressure required for both the starting clutch CS and the first clutch C1 by the oil pump that is rotationally driven at the target rotational speed Nmt can be secured in the second control region D2 of the specific slip power generation control. In this case, installation of an electric oil pump as another oil pressure source capable of operating independently of the internal combustion engine 11 and the rotating electrical machine 12 as the driving force sources of the vehicle 6 can be omitted, whereby manufacturing cost of the drive device 1 can be reduced. Note that it is also preferable to determine the target rotational speed Nmt in order to secure the supply oil pressure required for all the engagement devices including the starting clutch CS and the first clutch C1 as well.

(2) The first embodiment is described with respect to an example in which the target rotational speed Nmt is determined based on the allowable upper limit temperature U1 of the rotating electrical machine 12 that is provided to allow the rotating electrical machine 12 to operate continuously. The second embodiment is described with respect to an example in which the target rotational speed Nmt is determined based on the allowable upper limit temperature U1 of the rotating electrical machine 12 and the allowable upper limit temperature U2 of the first clutch C1 that is provided to allow the first clutch C1 to operate continuously. However, embodiments of the present invention are not limited to these examples. That is, for example, it is also one of the preferred embodiments of the present invention that, in the case where an allowable upper limit temperature U3 that is provided to allow the inverter device 27 to operate continuously is set for the inverter device 27, the target rotational speed Nmt be determined based on the allowable upper limit temperature U3 of the inverter device 27. In this case, the inverter device 27 functions as a "controller" in the present invention. It is also one of the preferred embodiments of the present invention that the target rotational speed Nmt be determined based on any one of the allowable upper limit temperature U1, U2, and U3 or on any combination of two or more of the allowable upper limit temperature U1, U2, and U3.

(3) The first embodiment is described with respect to an example in which the target rotational speed Nmt is determined based on the rotational speeds of the input shaft I and the output shaft O, the required power generation amount Gd, and the amount of heat generation and the cooling performance of the rotating electrical machine 12. The second embodiment is described with respect to an example in which the target rotational speed Nmt is determined based also on the amount of heat generation and the cooling performance of the first clutch C1 in addition to these. However, embodiments of the present invention are not limited to these examples. That is, it is also one of the preferred embodiments of the present invention that the target rotational speed Nmt be determined based also on the amount of heat generation and the cooling performance of the starting clutch CS, in addition to these. As in the above embodiments, in the configuration in which the transfer torque capacity Tcs of the starting clutch CS is larger than the transfer torque capacity Tc1 of the first clutch C1 by an amount corresponding to the power generation torque Tg during the specific slip power generation control, the starting clutch CS generates a larger amount of heat under such conditions that the differential rotational speeds ΔN1, ΔN2 are the same. On the other hand, in each of the above embodiments, the starting clutch CS has higher cooling performance or higher heat resistance than the first clutch C1. Accordingly, in view of the above, it is preferable to determine the target rotational speed Nmt that can suppress overheating of both the starting clutch CS and the first clutch C1 in a well-balanced manner.

(4) The second embodiment is described with respect to an example in which the target differential rotational speed ΔNt is determined based on the allowable upper limit temperature U2 of the first clutch C1 that is provided to allow the first clutch C1 to operate continuously, and the first target rotational speed Nmt1 is determined based on this target differential rotational speed ΔNt. However, embodiments of the present invention are not limited to this example. That is, it is also one of the preferred embodiments of the present invention to determine the target differential rotational speed ΔNt and the first target rotational speed Nmt1 based on, e.g., the power consumption (for example, the total rated power consumption that is set in advance based on the rated power consumption of each auxiliary machine) of auxiliary machines provided in the vehicle 6.

(5) Each of the above embodiments is described with respect to an example in which the required-power-generation-amount determining section 47 determines the required power generation amount Gd as the total rated power consumption that is set in advance based on the rated power consumption of each auxiliary machine, in order to make it possible to easily secure the amount of electric power enough for the electric power that is predicted to be consumed by the auxiliary machines in the vehicle 6 during traveling of the vehicle 6. However, embodiments of the present invention are not limited to these examples. That is, it is also one of the preferred embodiments of the present invention to set the required power generation amount Gd based on, e.g., actual power consumption that is the amount of electric power actually consumed by the auxiliary machines in the vehicle 6 during traveling of the vehicle 6. Thus, the amount of power enough for the electric power that is actually consumed by the auxiliary machines during traveling of the vehicle 6 can be reliably secured. In this case, the control device 3 includes an actual-power-consumption calculating section that calculates actual power consumption of the auxiliary machines during traveling of the vehicle 6. The actual-power-consumption calculating section monitors the operating state of each auxiliary machine provided in the vehicle 6, and calculates actual power consumption of each auxiliary machine. For example, for a compressor, pumps, etc., the actual-power-consumption calculating section calculates the actual power consumption based on the torque, the rotational speed, etc. for driving their drive shafts. For example, for lamps etc., the actual-power-consumption calculating section calculates the actual power consumption based on the current, the voltage, etc. that are supplied to them. The actual-power-consumption calculating section calculates the overall actual power consumption of the auxiliary machines by integrating the actual power consumption of all the auxiliary machines.

(6) Each of the above embodiments is described with respect to an example in which the required-power-generation-amount determining section 47 determines the total rated power consumption, which is set in advance based on the rated power consumption of each auxiliary machine, as the required power generation amount Gd as it is. However, embodiments of the present invention are not limited to these examples. That is, it is also one of the preferred embodiments of the present invention that the required power generation amount Gd determined as described above be corrected based on, e.g., the amount of electric power stored in the electrical power storage device 28.

(7) Each of the above embodiments is described with respect to an example in which the torque control is performed on the starting clutch CS in the first control region D1 and the second control region D2 of the specific slip power generation control. However, embodiments of the present invention are not limited to these examples. That is, it is also one of the preferred embodiments of the present invention that the rotational speed control is performed on the starting clutch CS. Note that in the rotational speed control of the starting clutch CS, the engagement pressure of the starting clutch CS is controlled so as to maintain, e.g., a constant rotational speed of the internal combustion engine 11 rotating with the input shaft I.

(8) Each of the above embodiments is described with respect to an example in which the starting clutch CS as the "first engagement device" and the first clutch C1 as the "second engagement device", which are provided in the drive device 1 to be controlled by the control device 3, are hydraulically driven engagement devices whose engagement pressure is controlled according to the oil pressure the is supplied. However, embodiments of the present invention are not limited to these examples. That is, the first engagement device and the second engagement device need only be able to adjust the transfer torque capacity according to an increase or decrease of the engagement pressure, and it is also one of the preferred embodiments of the present invention to configure, e.g., one or both of these engagement devices as electromagnetic engagement devices whose engagement pressure is controlled according to the electromagnetic force that is generated.

(9) Each of the above embodiments is described with respect to an example in which, in the drive device 1 to be controlled by the control device 3, the first clutch C1 for shifting, which is one of the plurality of friction engagement devices included in the speed change mechanism 13, is the "second engagement device." However, embodiments of the present invention are not limited to these examples. That is, it is also one of the preferred embodiments of the present invention that, e.g., another friction engagement device such as a clutch or a brake included in the speed change mechanism 13 may be the "second engagement device." Note that in the case where the second engagement device is the brake in the speed change mechanism 13, a non-rotating member such as a drive device case is coupled to one of engagement members of the brake, and the rotational speed of the one engagement member is always zero.

Figure 9:
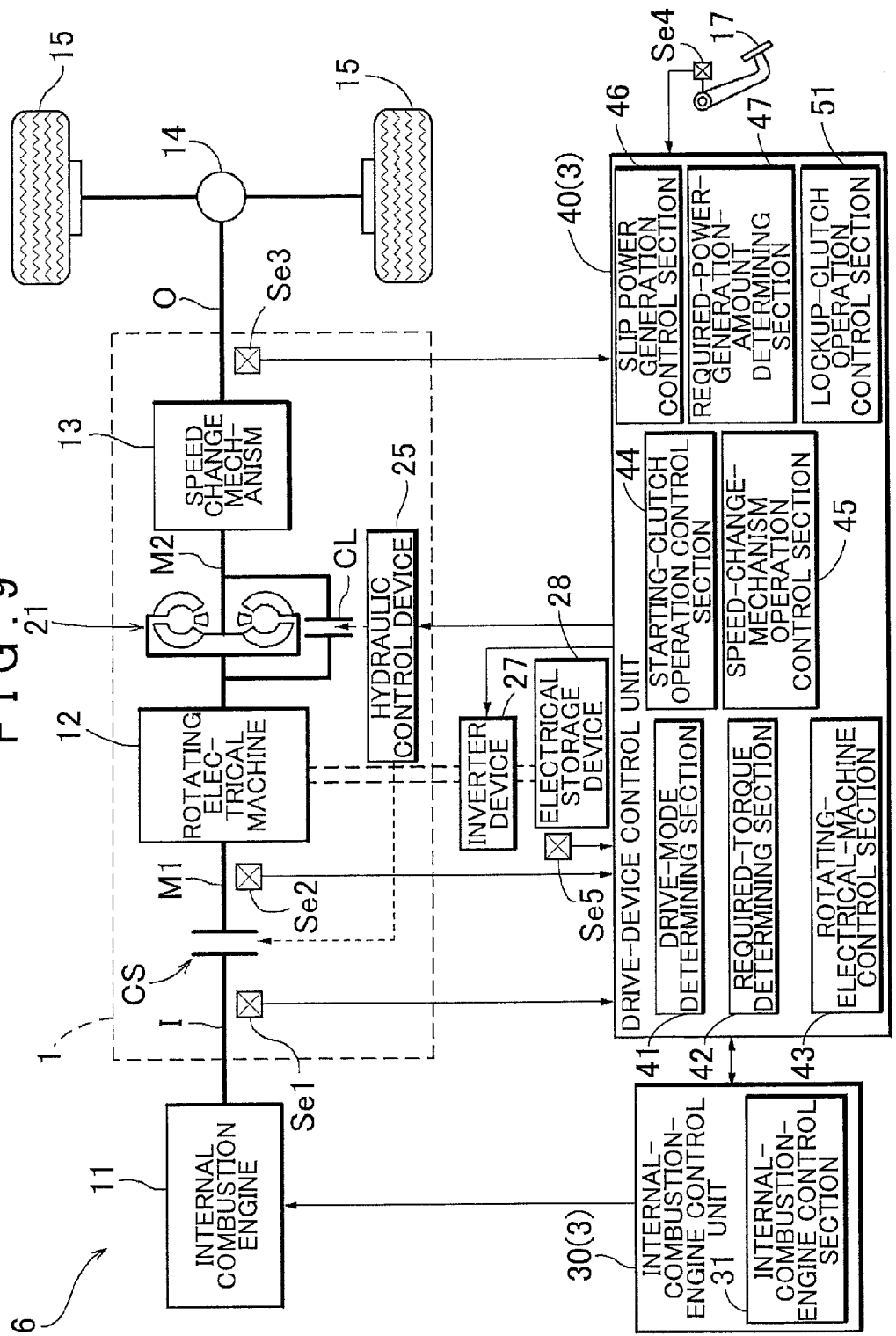
FIG. 9 is a schematic diagram showing a schematic configuration of a vehicle drive device and a control device thereof according to another embodiment.

(10) Each of the above embodiments is described with respect to an example in which the first clutch C1 for shifting, which is included in the speed change mechanism 13, is the "the second engagement device" in the drive device 1 to be controlled by the control device 3. However, embodiments of the present invention are not limited to these examples. That is, the "second engagement device" may be an engagement device other than the engagement device for shifting included in the speed change mechanism 13, if it is the engagement device provided between the rotating electrical machine 12 and the output shaft O on the power transmission path that connects the input shaft I to the output shaft O. It is also one of the preferred embodiments of the present invention that, in the case where a fluid transmission device such as a torque converter 21 is provided between the rotating electrical machine 12 and the speed change mechanism 13, as shown in, e.g., FIG. 9, a lockup clutch CL of this torque converter 21 be the "second engagement device." In this case, the control device 3 includes a lockup-clutch operation control section 51 that controls operation of the lockup clutch CL. Various operations and effects described in the above embodiments can be achieved by controlling the operation of the lockup clutch CL by the lockup-clutch operation control section 51 in a manner similar to that in which the first-clutch operation control section 45a controls the operation of the first clutch C1 in the above embodiments.

Figure 10:
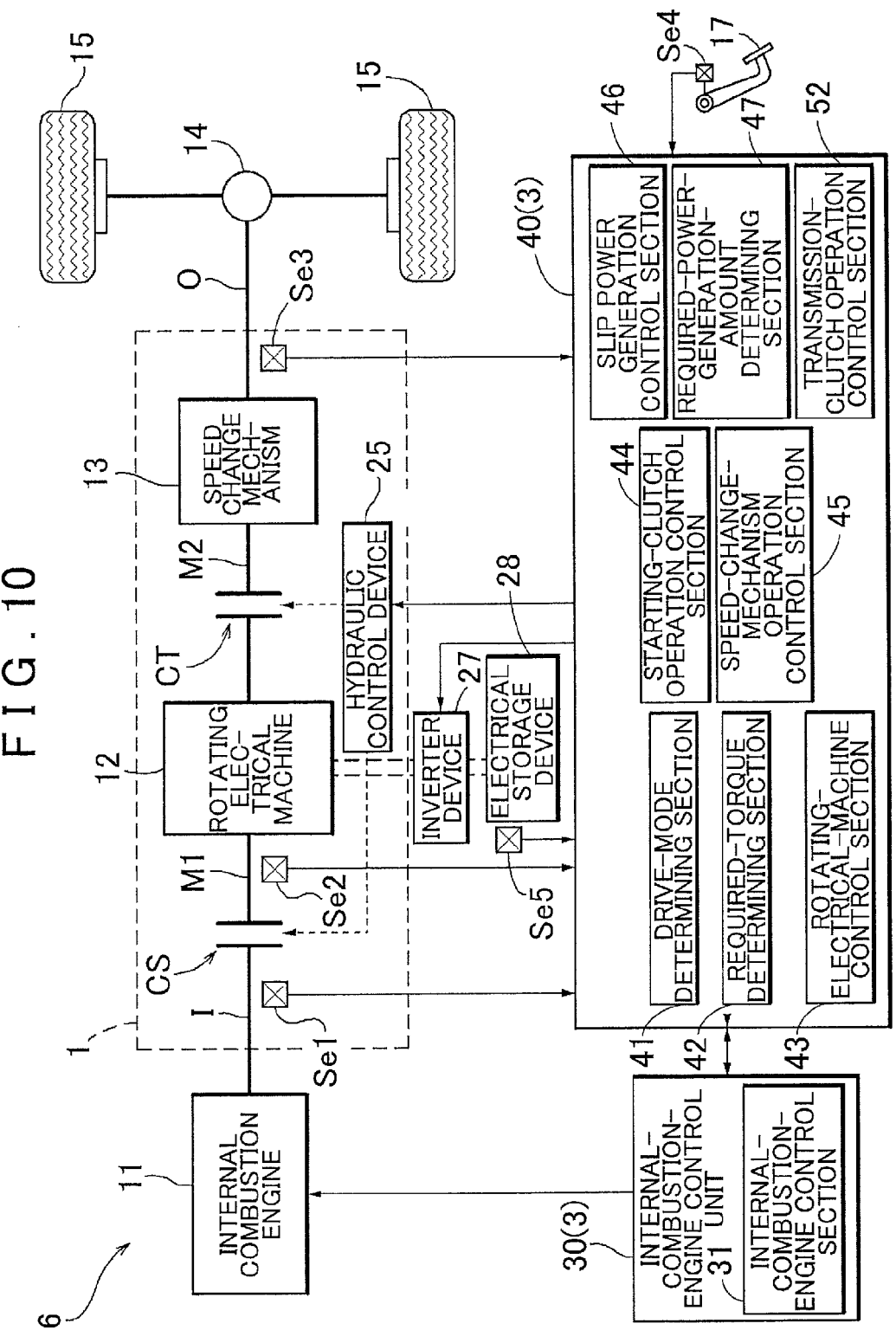
FIG. 10 is a schematic diagram showing a schematic configuration of a vehicle drive device and a control device thereof according to still another embodiment.

(11) Alternatively, as shown in, e.g., FIG. 10, it is also one of the preferred embodiments of the present invention that a transmission clutch CT provided between the rotating electrical machine 12 and the speed change mechanism 13 be the "second engagement device." In this case, the control device 3 includes a transmission-clutch operation control section 52 that controls operation of the transmission clutch CT. The various operations and effects described in the above embodiments can be achieved by controlling the operation of the transmission clutch CT by the transmission-clutch operation control section 52 in a manner similar to that in which the first-clutch operation control section 45a controls the operation of the first clutch C1 in the above embodiments.

(12) Note that in the configuration in which the lockup clutch CL or the transmission clutch CT is the "second engagement device" in the drive device 1 to be controlled by the control device 3, the speed change mechanism 13 may be configured as, e.g., an automatic continuously variable speed change mechanism capable of steplessly changing the speed ratio, a manual stepped speed change mechanism manually switchably having a plurality of shift speeds having different speed ratios, a fixed speed change mechanism having only one shift speed having a fixed speed ratio (including "1"), etc. The speed change mechanism 13 may be set at any position if at least the starting clutch CS, the rotating electrical machine 12, and the second engagement device are sequentially arranged in this order on the power transmission path connecting the input shaft I to the output shaft O.

Moreover, it is also one of the preferred embodiments of the present invention that, even if the drive device 1 to be controlled by the control device 3 includes the lockup clutch CL or the transmission clutch CT, the slip power generation control described in the above embodiments be performed by using as the "second engagement device" the first clutch C1 for shifting etc. included in the speed change mechanism 13, rather than the lockup clutch CL or the transmission clutch CT.

(13) Each of the above embodiments is described with respect to an example in which the speed change mechanism 13 is configured as an automatic stepped speed change mechanism including a plurality of friction engaging devices and switchably having a plurality of speed ratios (a kind of shift modes) having different speed ratios. However, embodiments of the present invention are not limited to these examples. That is, the speed change mechanism 13 need only be configured to include at least one friction engagement device and to be able to switch between a plurality of shift modes, and it is also one of the preferred embodiments of the present invention that the speed change mechanism 13 be configured as a mechanism capable of switching between a forward shift speed (a kind of shift modes) and a reverse shift speed (a kind of shift modes) by selectively drivingly coupling the friction engagement devices. In this case, it is also preferable that the speed change mechanism 13 be configured to be able to change the speed ratio independently of the friction engagement devices.

(14) Each of the above embodiments is described with respect an example in which the control device 3 includes the internal-combustion-engine control unit 30 that mainly controls the internal combustion engine 11, and the drive-device control unit 40 that mainly controls the rotating electrical machine 12, the starting clutch CS, and the speed change mechanism 13. However, the embodiments of the present invention are not limited to these examples. That is, for example, it is also one of the preferred embodiments of the present invention that the single control device 3 be configured to control all of the internal combustion engine 11, the rotating electrical machine 12, the starting clutch CS, the speed change mechanism 13, etc. Alternatively, it is also one of the preferred embodiments of the present invention that the control device 3 be configured to include individual control units that control the internal combustion engine 11, the rotating electrical machine 12, and other various configurations, respectively. Assignment of the function parts described in each of the above embodiments is merely by way of example, and it is also possible to combine a plurality of function parts or to subdivide one function part.

(15) Regarding other configurations as well, the embodiments disclosed in the specification are merely by way of example in all respects, and embodiments of the present invention are not limited to these embodiments. That is, the configurations that are not described in the claims of the present application can be modified as appropriate without departing from the object of the present invention.

The present invention can be preferably used for control devices that control a vehicle drive device in which a first engagement device, a rotating electrical machine, a second engagement device, and an output member are sequentially arranged in this order from an input member side on a power transmission path that connects the input member drivingly coupled to an internal combustion engine to the output member drivingly coupled to wheels.

What is claimed:

1. A control device that controls a vehicle drive device in which a first engagement device, a rotating electrical machine, a second engagement device, and an output member are sequentially arranged in this order from an input member side on a power transmission path that connects an input member drivingly coupled to an internal combustion engine to the output member drivingly coupled to wheels, wherein
the control device executes a slip drive mode in order to control both the first engagement device and the second engagement device to a slip engaged state, and to control a rotational speed of the rotating electrical machine to a value that is lower than a rotational speed of the input member and higher than a rotational speed of the output member, and
the control device executes the slip drive mode when a current vehicle required force that is required in order to cause the vehicle to travel is increased in a state in which the input member is drivingly coupled to the internal combustion engine, the first engagement device is in a direct-coupling engaged state and the second engagement device is in a disengaged state.

2. The control device according to claim 1, wherein the control device controls the rotational speed of the rotating electrical machine to decrease at a constant rate of change with time after the first engagement device is placed in the slip engaged state.

3. The control device according to claim 2, wherein the input member is drivingly coupled to the first engagement device of the input member side so as to rotate therewith and the rotating electrical machine is drivingly coupled to the first engagement device of an output member side so as to rotate therewith.

4. The control device according to claim 1, wherein the input member is drivingly coupled to the first engagement device of the input member side so as to rotate therewith and the rotating electrical machine is drivingly coupled to the first engagement device of an output member side so as to rotate therewith.

* * * * *